US012753272B2

(12) United States Patent
Hitrik

(10) Patent No.: US 12,753,272 B2
(45) Date of Patent: Oct. 6, 2026

(54) MELAMINE-BASED POLYMERS AND USES THEREOF

(71) Applicant: BIO-FENCE LTD., Ashdod (IL)

(72) Inventor: Maria Hitrik, Jerusalem (IL)

(73) Assignee: BIO-FENCE LTD., Ashdod (IL)

(*) Notice: Subject to any disclaimer, the term of this patent is extended or adjusted under 35 U.S.C. 154(b) by 726 days.

(21) Appl. No.: 18/000,313

(22) PCT Filed: Jun. 1, 2021

(86) PCT No.: PCT/IL2021/050650
§ 371 (c)(1),
(2) Date: Nov. 30, 2022

(87) PCT Pub. No.: WO2021/245663
PCT Pub. Date: Dec. 9, 2021

(65) Prior Publication Data

US 2024/0018300 A1 Jan. 18, 2024

Related U.S. Application Data

(60) Provisional application No. 63/032,896, filed on Jun. 1, 2020.

(30) Foreign Application Priority Data

Jun. 1, 2020 (IL) ........................................ 275050

(51) Int. Cl.
*C08G 61/12* (2006.01)
*C08G 73/02* (2006.01)
(Continued)

(52) U.S. Cl.
CPC ....... *C08G 61/122* (2013.01); *C08G 73/0273* (2013.01); *C09D 5/14* (2013.01); *C09D 161/28* (2013.01)

(58) Field of Classification Search
CPC .............. C08G 61/122; C08G 73/0273; C08G 73/0644; C08G 73/026; C09D 5/14;
(Continued)

(56) References Cited

U.S. PATENT DOCUMENTS 5,539,042 A 7/1996 Birch
10,072,106 B2 9/2018 Mizrahi et al.
(Continued)

FOREIGN PATENT DOCUMENTS

EP 2 872 583 A0 1/2014
EP 3 263 560 A1 3/2018
(Continued)

OTHER PUBLICATIONS

Demir, et al., N-Halamine Biocidal Materials with Superior Antimicrobial Efficacies for Wound Dressings, Molecules, 22:1-17 (2017).

(Continued)

*Primary Examiner* — Shane Fang
(74) *Attorney, Agent, or Firm* — Troutman Pepper Locke LLP

(57) ABSTRACT

The present invention relates to melamine-based compounds that act as a carrier for biocides, products comprising the compounds and uses thereof.

20 Claims, 12 Drawing Sheets

(51) Int. Cl.
*C09D 5/14* (2006.01)
*C09D 161/28* (2006.01)

(58) Field of Classification Search
CPC . C09D 179/00; C09D 161/28; H01L 51/5253; H01L 51/5262; C08L 39/00
See application file for complete search history.

(56) References Cited

U.S. PATENT DOCUMENTS

| | | | | |
|---|---|---|---|---|
| 2003/0194507 | A1* | 10/2003 | Secord | B41M 5/267 427/385.5 |
| 2006/0058431 | A1 | 3/2006 | Cartier et al. | |
| 2007/0167543 | A1 | 7/2007 | Schwesig et al. | |
| 2016/0177128 | A1* | 6/2016 | Cox | C08G 75/0231 428/220 |
| 2018/0105618 | A1 | 4/2018 | Mizrahi et al. | |
| 2019/0256702 | A1 | 8/2019 | Geyer et al. | |

FOREIGN PATENT DOCUMENTS

| | | | |
|---|---|---|---|
| IL | 234250 | | 7/2019 |
| JP | 2007-316179 | A | 12/2007 |
| WO | 2005/116139 | A2 | 12/2005 |
| WO | 2009/155086 | A2 | 12/2009 |
| WO | 2011/141111 | A2 | 11/2011 |
| WO | 2015/151031 | A1 | 10/2015 |
| WO | 2017/063091 | A1 | 4/2017 |
| WO | 2018/096011 | A1 | 5/2018 |

OTHER PUBLICATIONS

Dong, et al., Chemical Insights into Antibacterial N-Halamines, Chemical Reviews, 117(6):4806-4862 (2017).

* cited by examiner

MELAMINE-BASED POLYMERS AND USES THEREOF

TECHNOLOGICAL FIELD

The present invention provides melamine-based polymers and uses thereof. #

BACKGROUND ART

References considered to be relevant as background to the presently disclosed subject matter are listed below:

[1] Dong, A.; Wang, Y-J.; Gao, Y.; Gao T.; Gao, G. Chemical insights into antimicrobial N-halamines. *Chem. Rev.,* 2017, 117 (6), 4806-4862.

[2] Demir, B.; Broughton, R. M.; Qiao, M.; Huang, T-S.; Worley. S.D. N-halamine biocidal materials with superior antimicrobial efficacies for wound dressings. *Molecules,* 2017, 22 (10), 1582.

[3] U.S. Pat. No. 10,072,106

[4] IL Patent No. 234,250

Acknowledgement of the above references herein is not to be inferred as meaning that these are in any way relevant to the patentability of the presently disclosed subject matter.

BACKGROUND

There is a growing need for controlling microbial growth, colonization and biofilm formation on surfaces. There is a number of polymers with anti-microbial effects. Examples of such polymers, including, for example N-halamine-based polymers which contain one or more nitrogen-halogen covalent bonds are described [1, 2, 3, 4].

GENERAL DESCRIPTION

The present disclosure provides in accordance with some aspects, a compound having a structure represented by Formula (I):

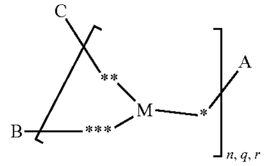

wherein M is a melamine-based monomeric unit, *, , * denote polymerization points, n denote the number of * and is selected from 0 to 100, q denote the number of  and is selected from 0 to 100, r denote the number of * and is selected from 0 to 100, and wherein A, B and C are end groups and each is independently selected from OH, H,

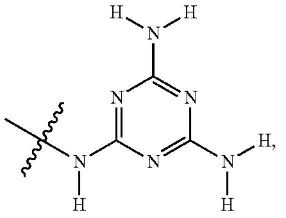

$—C(OH)—H_2$, —C(—O)—H, —C(=O)—OH, $—CH_3$, optionally substituted alkyl, optionally substituted cycloalkyl, optionally substituted hetcrocyclyl, optionally substituted aryl, optionally substituted heteroaryl, $(C(OH))_m$, $(C(OH))_m—(O—CH_2)_p$, $(C(OH))_m—(OCH_2—NH—C(=O)—NH—CH_2OCH_2—)_p$, $(C(OH))_m—(—NH—C(=O)—NH—CH_2)_p$, $(C(OH))_m—(C(=O))_p$, $(C(OH))_m—(CH_2)_p—C(=O)$ or $(C(OH))_m—(CH_2)_p—C(OH)$.

In some embodiments, n+q+r is 0. In some embodiments, n+q+r is at least 1. In some embodiments, n+q+r is at least 2.

In accordance with some aspects, it is provided a melamine-based polymer comprises at least two monomeric unit, each monomeric unit having a structure represented by any one of Formula II-XXV.

The present disclosure provides in accordance with some aspects, a melamine-based compound for use as a carrier for at least one biocide.

The present disclosure provides in accordance with some aspects, a melamine-based compound for use as an adjuvant for at least one biocide.

The present disclosure provides in accordance with some aspects, a melamine-based polymer for use as a carrier for at least one biocide.

The present disclosure provides in accordance with some aspects, a melamine-based polymer for use as an adjuvant for at least one biocide.

In accordance with some other aspects, the present disclosure provides a product comprising a melamine-based compound comprising a melamine-based monomeric unit having a structure represented by any one of Formula II-XXV or a melamine-based compound having a structure represented by Formula I and/or a melamine-based polymer comprises at least two monomeric unit, each monomeric unit having a structure represented by any one of Formula II-XXV.

In some embodiments, the product is a paint formulation. In some other embodiments, the product is a plastic product. In some other embodiments, the product is a solid product.

In accordance with some further aspects, the present disclosure provides a method for reducing or eliminating growth of at least one microbial, the method comprises applying an effective amount of a melamine-based compound comprising a melamine-based monomeric unit having a structure represented by any one of Formula II-XXV or a melamine-based compound having a structure represented by Formula I and/or a melamine-based polymer comprises at least two monomeric unit, each monomeric unit having a structure represented by any one of Formula II-XXV, to thereby reduce or eliminate growth of at least one microbial.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A shows an exemplary cross section of a ready for use product (e.g. a resin) comprising at least one melamine-based polymer of the present disclosure (the melamine-based polymer is denoted herein at times also as antiseptic precursor compound (APC)) (shown as circles), FIG. 1B shows a charging cross section view of the product onto which a biocidal (e.g.

$OCl^-$) is applied (for example by spraying) and attached to the APC (shown as darker circles), the APC onto which a biocide was applied is denoted herein as charged APC, FIG. 1C shows a biocide activity cross section view, after application of the biocide, an antimicrobial activity is gained, at times after discharging of the APC, i.e. no biocide is available anymore, this activity can be regained by sequential applications of the biocide onto the polymer (APC), as shown in FIG. 1A.

FIG. 5A—*Aspergillus niger* FIG. 5B—*Saccharomyces Cerevisiaea*; FIG. 5C-*Listeria Monocytogenes* and FIG. 5D *Salmonella Enterica* Abaetetuba, activated control is with biocide without polymer.

DETAILED DESCRIPTION OF EMBODIMENTS

Figure 1A:
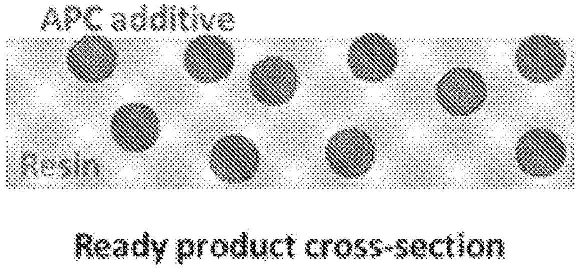
FIGS. 1A-1C are schematic representations of some embodiments of the present disclosure.

The present application is based on development of melamine-based compounds, such as for example melamine-based monomeric unit or melamine-based polymers that are capable of interacting, by non-covalent binding, with a variety of biocides and specifically with negatively charged biocide. The melamine-based compounds encompass both melamine-based monomeric unit and melamine-based polymers and are denoted herein at times, as melamine-based antiseptic precursor compound (APC). #

As shown in the Examples below, it was surprisingly found that the melamine-based compounds (e.g. polymers), while serving as a carrier (delivery system) for the biocides, stabilize the biocides (i.e. reducing evaporation from a biocide treated surface) as well as enable a unique dual release profile of the biocide, including an immediate biocidal activity as well as a prolonged biocidal activity. In addition, it was found that a biocidal activity is maintained even after repeated bacteria loading.

Without being bound by theory, it was suggested that upon application of the at least one biocide onto the melamine-based compounds, including inter alia, melamine based polymers, the biocide is dispersed within the melamine-based polymer's polymeric matrix such that its presence at the melamine-based polymer's surface provides it's immediate activity, whereas it's distribution within inner layers of the melamine-based polymeric matrix and it's migration (diffusion) to the polymer surface provides it's prolong effect as well as its ability to maintain activity repeated microbial contaminations.

The inventors have envisioned that the melamine-based polymers can be used in a variety of applications, including, inter alia, in coating surfaces, such as plastic surfaces, metal surfaces, wood surfaces, glass surfaces, ceramic surfaces, porcelain surfaces, tiles and the like, as well as in the preparation of plastic materials such as bulk plastic products, films or fibers, non-woven textile, flexible or hard plastic materials.

It was suggested that the biocide while present within the melamine-based compound is also capable of being dispersed within a product specific polymer, including, inter alia, a resin. Without being bound by theory, it was suggested that the product specific polymer may also affect the unique dual release profile of the biocide.

The biocide can be applied at various stages, including, inter alia, directly to the melamine-based polymer or any product comprising the same, or onto a surface coated with the melamine-based polymer or a product comprising the same.

Hence, in accordance with some aspects, the present disclosure provides a melamine-based compound. In some embodiments, the melamine-based compound comprises a melamine-based polymer. In some embodiments, the melamine-based compound comprises at least one monomeric unit.

The present disclosure provides in accordance with some aspects, a melamine-based compound having a structure represented by Formula (I):

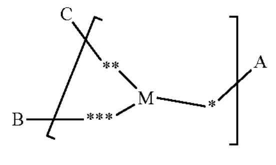

wherein M is a melamine-based monomeric unit, *, , * denote polymerization points, n denote the number of * and is selected from 0 to 100, q denote the number of  and is selected from 0 to 100, r denote the number of * and is selected from 0 to 100, and wherein A, B and C is each an end group. In some embodiments, the end group is independently selected from OH, H,

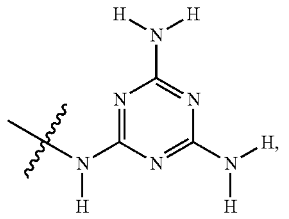

—C(OH)$_m$—H$_2$, —C(=O)$_m$—H, —C(=O)$_m$—OH, —CH$_3$, optionally substituted alkyl, optionally substituted cycloalkyl, optionally substituted hetcrocyclyl, optionally substituted aryl, optionally substituted heteroaryl, (C(OH))$_m$—(O—CH$_2$)$_p$—CH$_3$, (C(OH))$_m$—(O—CH$_2$)$_p$—H$_2$, (C(OH))$_m$—(OCH$_2$—NH—C(O)—NH—CH$_2$OCH$_2$—)$_p$—CH$_3$, (C(OH))$_m$—(OCH$_2$—NH—C(O)—NH—CH$_2$OCH$_2$—)$_p$—H$_2$, (C(OH))$_m$—(—NH—C(=O)—NH—CH$_2$)$_p$—CH$_3$, (C(OH))$_m$—(—NH—C(=O)—NH—CH$_2$)$_p$—H$_2$, (C(OH))$_m$—(C(=O))$_p$, (C(OH))$_m$—(CH$_2$)$_p$—C(O) or C(OH)$_m$—(CH$_2$)$_p$—C(OH)$_m$—H$_2$, m and p is each independently from the other an integer between 1 and 10.

In some embodiments, n+q+r is 0. In some embodiments, n+q+r is 1.

In such embodiments, melamine-based compound comprises one monomeric unit.

In some embodiments, the n+q+r is at least 2. In such embodiments, melamine-based compound comprises at least two monomeric units. In some embodiments, in the melamine-based polymer n+q+r is at least 2.

In some embodiments, n is selected from 0 to 100. In some embodiments, n is selected from 1 to 50. In some embodiments, n is selected from 1 to 40. In some embodiments, n is selected from 1 to 30. In some embodiments, n is selected from 1 to 25. In some embodiments, n is selected from 1 to 20. In some embodiments, n is selected from 1 to 15. In some embodiments, n is an integer selected from 1 to 10. In some embodiments, n is selected from 1 to 5. In some embodiments, n is 0, at times n is 1, at times n is 2, at times n is 3 at times, n is 4 at times n is 5 at times, n is 6 at times, n is 7 at times, n is 8 at times, n is 9 at times, n is 10 at times, n is 11 at times, n is 12 at times, n is 13 at times, n is 14 at times, n is 15 at times, n is 16 at times, n is 17 at times, n is 18 at times, n is 19 at times, n is 20 at times, n is 21 at times, n is 22 at times n is 23, at times n is 24, at times n is 25.

It should be noted that for n=0, M is directly attached to A, i.e. no polymerization at point * takes place.

In some embodiments, q is selected from 0 to 100. In some embodiments, q is selected from 1 to 50. In some embodiments, q is selected from 1 to 40. In some embodiments, q is selected from 1 to 30. In some embodiments, q is selected from 1 to 25. In some embodiments, q is selected from 1 to 20. In some embodiments, q is selected from 1 to 15. In some embodiments, q is an integer selected from 1 to 10. In some embodiments, q is an integer selected from 1 to 5. In some embodiments, q is 0, at times q is 1, at times q is 2, at times q is 3 at times, q is 4 at times q is 5 at times, q is 6 at times, q is 7 at times, q is 8 at times, q is 9 at times, q is 10 at times, q is 11 at times, q is 12 at times, q is 13 at times, q is 14 at times, q is 15 at times, q is 16 at times, q is 17 at times, q is 18 at times, q is 19 at times, q is 20 at times, q is 21 at times, q is 22 at times q is 23, at times q is 24, at times q is 25.

It should be noted that for q=0, M is directly attached to C, i.e. no polymerization at point ** takes place.

In some embodiments, r is an integer selected from 0 to 100. In some embodiments, r is selected from 1 to 50. In some embodiments, r is selected from 1 to 40. In some embodiments, r is selected from 1 to 30. In some embodiments, r is selected from 1 to 25. In some embodiments, r is selected from 1 to 20. In some embodiments, r is selected from 1 to 15. In some embodiments, r is selected from 1 to 10. In some embodiments, r is selected from 1 to 5. In some embodiments, r is 0, at times r is 1, at times r is 2, at times r is 3 at times, r is 4 at times r is 5 at times, r is 6 at times, r is 7 at times, r is 8 at times, r is 9 at times, r is 10 at times, r is 11 at times, r is 12 at times, r is 13 at times, r is 14 at times, r is 15 at times, r is 16 at times, r is 17 at times, r is 18 at times, r is 19 at times, r is 20 at times, r is 21 at times, r is 22 at times r is 23, at times r is 24, at times r is 25.

It should be noted that for r=0, M is directly attached to B, i.e. no polymerization at point *** takes place.

In some embodiments, n+q+r is at least 1, at least 2, at times at least 3, at times at least 5, at times at least 10, at times at least 20, at times at least 40, at times at least 50.

In the following text, when referring to the melamine-based polymer it is to be understood as also referring to the melamine-based compound, melamine based monomeric unit, population of polymers, products and methods disclosed herein. Thus, whenever providing a feature with reference to the polymer, it is to be understood as defining the same feature with respect to the melamine-based compound, melamine based monomeric unit, populations, products and methods, mutatis mutandis.

A polymer as known in the art refers to a substance or material including repeating units, a repeating unit in accordance with the present disclosure is denoted as monomeric unit. that is a melamine-based monomeric unit. As described herein, the present disclosure encompasses also a melamine-based compound comprising at least one monomeric unit.

In some embodiments, the polymer is a homo polymer (i.e. including only a single type of the monomeric unit). In some embodiments, the polymer is a copolymer (i.e. including two or more types of monomeric units). In some embodiments, the polymer is a terpolymer (i.e. including three types of monomeric units).

Unless otherwise stated, when referring to a polymer comprising two or more monomeric units, each monomeric unit having a structure represented by any one of the Formulae listed below (e.g. any one of Formula II-XXV), the monomeric unit is linked (attached, connected) to at least one other monomeric unit through at least one of *, , *. It should be noted that A, B and C are end groups either of a polymer or a single monomeric unit.

It should be noted that when there is no polymerization through *, , *—the melamine-based compound includes one monomeric unit.

The polymer of the present disclosure is not limited to a specific morphology. In some embodiments, the polymer is a linear polymer. A linear polymer is defined as a chain including a single strand of monomeric units. In accordance with the present disclosure, a linear polymer will polymerize along the main polymer chain (i.e. along the chain defined by end groups A and B). In some embodiments, the polymer is a branched polymer. A branched polymer is a polymer in which at least one monomeric unit branch off from the main polymer chain.

In some embodiments, the monomeric unit is having a structure represented by Formula (II):

(II)

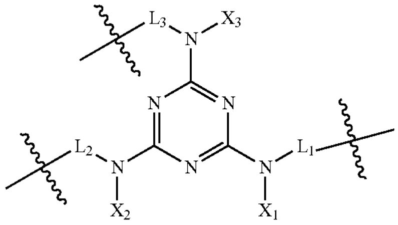

wherein:

$X_1$, $X_2$, $X_3$, is each independently of the other selected from H, alkyl, alkenyl, alkynyl, optionally substituted cycloalkyl, optionally substituted heterocyclyl, optionally substituted aryl or optionally substituted heteroaryl;

$L_1$, $L_2$, $L_3$ is each independently of the other selected from absent, optionally substituted alkyl, optionally substituted alkylene, optionally substituted alkynyl, optionally substituted heteroalkyl, optionally substituted heteroalkylene, optionally substituted heteroalkynyl, or $L_1$ is $R_1$-$R^a$, wherein $R_1$ is selected from $(N)_m$, $(C(OH))_m$, $(C(=O))_m$, $(CH_2)_m$, $(CH)_m$, $(C)_m$, $S(O)_m$; $L_2$ is $R_2$-$R^b$, wherein $R_2$ is selected from $(N)_m$, $(C(OH))_m$, $(C(=O))_m$, $(CH_2)_m$, $(CH)_m$, $(C)_m$, $S(O)_m$; $L_3$ is $R_3$-$R^c$, wherein $R_3$ is selected from $(N)_m$, $(C(OH))_m$, $(C(=O))_m$, $(CH_2)_m$, $(CH)_m$, $(C)_m$, $S(O)_m$; m is independently an integer selected from 1 to 10, each of $R^a$, $R^b$, $R^c$ is independently of the other selected from absent or alkyl, alkylene, alkynyl, $(—O—)_p$, $(—O—CH_2—)_p$, $(—OCH_2—NH—C(=O)—NH—CH_2OCH_2—)_p$, $(—OCH_2—C(=O)—NH—C(=O)—CH_2OCH_2—)_p$, $(—OCH_2—NH—C(=O)—NH—CH_2—)_p$, $(—NH—)_p$, $(—NH—C(=O)—)_p$, $(—NH—C(=O)—NH—)_p$, $(—NH—C(=O)—NH—CH_2)_p$, $(—NH—C(=O)—NH—CH_2O—)_p$, $—NH—(CH_2)_p—C(=O)$, $—NH—(CH_2)_p—C(OH)$, $—NH—C(=O)—(CH_2)_p—$, $—(NH—CH_2)_p—$, $—NH—(CH_2)_p—$, $—NH—(S(=O))_p—(CH_2)_p—$, $—(NH—S(=O)—(CH_2))_p—$, $(C(=O))_p$, $(—C(=O)—NH—C(=O)—)_p$, $—C(=O)—(CH_2)_p—C(=O)$, $—C(=O)—(CH_2)_p—NH$, $—NH—(CH_2)_p—NH$, $—C(=O)—(CH_2)_p—C(OH)$, $—C(=O)—NH—(CH_2)_p—$, $C(=O)—(CH_2)_p—$, $(C(=O)—CH_2)_p$, $—(CH_2)_p$, $—(CH_2)_p—C(=O)$, $—(CH_2)_p—NH$, $—(CH_2)_p—C(OH)$, $(C(OH))_p$, $—C(OH)—(CH_2)_p—C(=O)$, $—C(OH)—(CH_2)_p—NH$, $—C(OH)—(CH_2)_p—C(OH)$, $—S—S—(CH_2)_p—$, $—S—(CH_2)_p—$, $—(S—CH_2)_p—$; p is an integer selected from 1 to 10 and  represents a connection point.

In some embodiments, $L_1$ is absent or $R_1$-$R^a$.

In some embodiments, $L_2$ is absent or $R_2$-$R^b$. In some embodiments, $L_2$ is absent.

In some embodiments, $L_3$ is absent or $R_3$-$R^c$. In some embodiments, $L_3$ is absent.

In some embodiments, the monomeric unit having a structure represented by Formula (III):

(III)

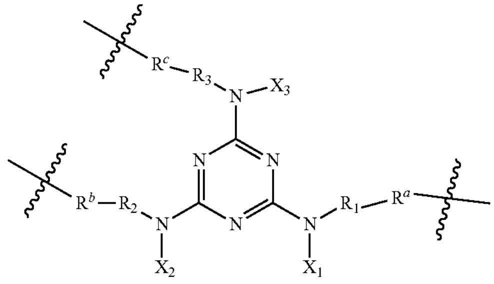

In some embodiments, $X_1$, $X_2$, $X_3$, is each independently of the other selected from H, alkyl, alkenyl or alkynyl.

In some embodiments, $X_1$, $X_2$, $X_3$, is each independently of the other selected from H and alkyl.

In some embodiments, $X_1$, $X_2$, $X_3$, is each independently of the other selected from H and $C_1$-$C_6$ alkyl.

In some embodiments, $X_1$, $X_2$, $X_3$, is each independently of the other selected from H and $C_1$-$C_3$ alkyl.

In some embodiments, $X_1$, $X_2$, $X_3$, is each independently of the other selected from H and $CH_3$.

In some embodiments, $X_1$ is H or alkyl.

In some examples, $X_1$ is methyl.

In some embodiments, $X_2$ is H.

In some embodiments, $X_3$ is H or alkyl.

In some embodiments, $R_1$, $R_2$, $R_3$ is independently of the other selected to be absent, $(N)_m$, $(C(OH))_m$, $(C(=O))_m$, $(CH_2)_m$, $S(=O)_m$.

In some embodiments, $R_1$ is absent, $(C(OH))_m$, $(C(=O))_m$, or $(CH_2)_m$.

In some embodiments, $R_2$ is absent, $(C(OH))_m$, $(C(=O))_m$, or $(CH_2)_m$.

In some embodiments, $R_2$ is absent or $(C(OH))_m$.

In some embodiments, $R_3$ is absent, $(C(OH))_m$, $(C(=O))_m$, or $(CH_2)_m$.

In some embodiments, $R_3$ is absent or $(C(OH))_m$.

In some embodiments, $R_1$ is $(C(=O))_m$, $R_2$ is absent and $R_3$ is absent.

In some embodiments, $R_1$ is $(C(OH))_m$, $R_2$ is $(C(OH))_m$ and $R_3$ is $(C(OH))_m$.

In some embodiments, $R_1$ is $(C(OH))_m$, $R_2$ is absent and $R_3$ is absent.

In some embodiments, $R_1$ is $(CH_2)_m$, $R_2$ is absent and $R_3$ is absent.

In some embodiments, $R_1$ is $(CH_2)_m$, $R_2$ is $(C(OH))_m$ and $R_3$ is absent.

In some embodiments, m is independently selected from 1 to 10, at times m is independently selected from 1 to 6, at times m is independently selected from 1 to 5, at times m is independently selected from 1 to 4, at times m is independently selected from 1 to 3, at times m is independently selected from 1 to 2, at times m is 1. In some embodiments, m is 1

In some embodiments, $R_1$ is absent, (C(OH)), (C(=O)), or $(CH_2)$. In some embodiments, $R_2$ is absent or (C(OH)). In some embodiments, $R_3$ is absent or (C(OH)).

In some embodiments, $R_1$ is (C(=O)), $R_2$ is absent and $R_3$ is absent.

In some embodiments, wherein $R_1$ is (C(OH)), $R_2$ is (C(OH)) and $R_3$ is (C(OH)).

In some embodiments, wherein $R_1$ is (C(OH)), $R_2$ is absent and $R_3$ is absent.

In some embodiments, wherein $R_1$ is $(CH_2)$, $R_2$ is absent and $R_3$ is absent.

In some embodiments, wherein $R_1$ is $(CH_2)$, $R_2$ is $(C(OH))$ and $R_3$ is absent.

In some embodiments, each of $R^a$, $R^b$, $R^c$ is independently of the other selected to be absent, $(—O—CH_2)_p$, $(OCH_2—NH—C(O)—NH—CH_2OCH_2—)_p$, $(—NH—CH_2—)_p$, $(—NH—C(=O)—NH—CH_2)_p$, $(C(=O))_p$, $—(CH_2)_p—C(O)$, $—(CH_2)_p—C(OH)$ or $(C(OH))_p$.

In some embodiments, $R_1$ is absent, $(C(OH))_m$, $(C(O))_m$, or $(CH_2)_m$ and $R^a$ is absent, $(—O—CH_2)_p$, $(OCH_2—NH—C(O)—NH—CH_2OCH_2—)_p$, $(—NH—CH_2—)_p$, $(—NH—C(=O)—NH—CH_2)_p$, $(C(=O))_p$, $—(CH_2)_p—C(O)$, $—(CH_2)_p—C(OH)$ or $(C(OH))_p$.

In some embodiments, $R_2$ is absent or $(C(OH))_m$ and $R^b$ is absent, $(—O—CH_2)_p$, $(OCH_2—NH—C(O)—NH—CH_2OCH_2—)_p$, $(—NH—C(=O)—NH—CH_2)_p$, $(C(=O))_p$, $—(CH_2)_p—C(O)$, $—(CH_2)_p—C(OH)$ or $(C(OH))_p$.

In some embodiments, $R_2$ is absent or $(C(OH))_m$ and $R^b$ is absent, $(CH_2)_p—C(OH)$ or $(C(OH))_p$.

In some embodiments, $R_3$ is absent or $(CH_2)_m$, $(C(OH))_m$ and $R^c$ is absent, $(NH—CH_2)_p$, $(CH_2)_p—C(OH)$ or $(C(OH))_p$.

In some embodiments, p is an integer between 1 to 10, at times p is an integer between 1 to 6, at times p is an integer between 1 to 5, at times p is an integer between 1 to 4, at times p is an integer between 1 to 3, at times p is an integer between 1 to 2, at times p is a 1.

In some embodiments, p is a 1. In some embodiments, p is a 3. In some embodiments, p is a 4.

In some embodiments, $R_1$ is $(C(O))$, $R_a$ is absent, $C(=O)$, $(CH_2)_4—C(=O)$ or $(CH_2)_3—C(=O)$, $R_2$ is absent and $R_3$ is absent.

In some embodiments, $R_1$ is $(C(OH))$, $R_a$ is absent, $C(OH)$, $(CH_2)_4—C(OH)$, $(CH_2)_3—C(OH)$, $R_2$ is $(C(OH))$ $R_b$ is absent, $C(OH)$, $(CH_2)_4—C(OH)$ or $(CH_2)_3—C(OH)$, $R_3$ is $(C(OH))$ and $R_c$ is absent, $C(OH)$, $(CH_2)_4—C(OH)$ or $(CH_2)_3—C(OH)$.

In some embodiments, $R_1$ is $(C(OH))$, $R_a$ is $C(OH)$, $(CH_2)_4—C(OH)$, $(CH_2)_3—C(OH)$, $R_2$ is $(C(OH))$ $R_b$ is $C(OH)$, $(CH_2)_4—C(OH)$ or $(CH_2)_3—C(OH)$, $R_3$ is $(C(OH))$ and $R_c$ is $C(OH)$, $(CH_2)_4—C(OH)$ or $(CH_2)_3—C(OH)$.

In some embodiments, $R_1$ is $(C(OH))$, $R_a$ is absent, $C(OH))$, $(CH_2)_4—C(OH)$, $(CH_2)_3—C(OH)$, $R_2$ is absent and $R_3$ is absent.

In some embodiments, $R_1$ is $(C(OH))$, $R_a$ is $(CH_2)_4—C(OH)$, $(CH_2)_3—C(OH)$, $R_2$ is absent and $R_3$ is absent.

In some embodiments, $R_1$ is $(CH_2)$, $R_a$ is absent, $—O—CH_2$, $OCH_2—NH—C(O)—NH—CH_2OCH_2—$, $R_2$ is absent and $R_3$ is absent.

In some embodiments, $R_1$ is $(CH_2)$, $R_a$ is absent, $(—NH—CH_2)_4$, $—O—CH_2$, $OCH_2—NH—C(O)—NH—CH_2OCH_2—$, $R_2$ is $(C(OH))$, $R_b$ is $(CH_2)_4—C(OH)$, $(CH_2)_3—C(OH)$ and $R_3$ is absent.

In some embodiments, $R_1$ is $(CH_2)$, $R_a$ is absent, $(—NH—CH_2)_4$, $—O—CH_2$, $OCH_2—NH—C(O)—NH—CH_2OCH_2—$, $R_2$ is absent, $R_3$ is $(CH_2)$ and $R_c$ is absent, $(—NH—CH_2)_4$, $—O—CH_2$, $OCH_2—NH—C(O)—NH—CH_2OCH_2—$.

In some embodiments, $R_2$ and $R^b$ are each absent and $X_2$ is H.

In some embodiments, the monomeric unit having a structure represented by Formula (IV):

(IV)

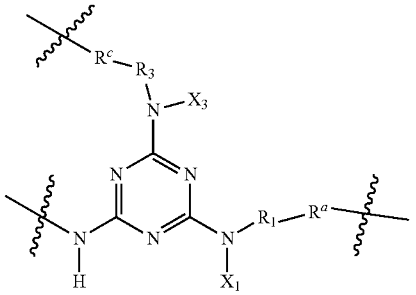

In some embodiments, $R_2$ and $R^b$ are each absent, $X_1$, and $X_3$ are each H.

In some embodiments, $R_1$ is $C(=O)$. In some embodiments, the monomeric unit having a structure represented by Formula (V):

(V)

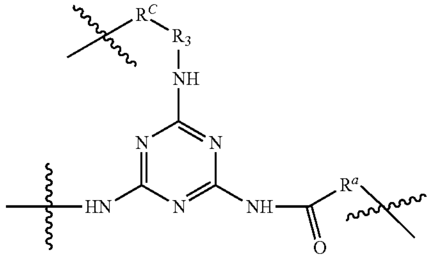

In some embodiments, $R_1$ is $C(=O)$, $R_2$, $R_3$ $R^b$, $R^c$ are each absent, $X_1$, $X_2$ and $X_3$ are each H and C is H.

In some embodiments, the monomeric unit having a structure represented by Formula (VI):

(VI)

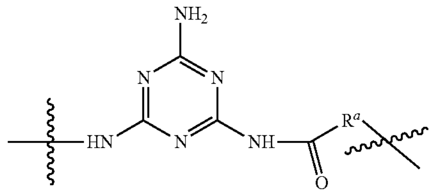

In some embodiments, $R^a$ is absent. In some embodiments, $R^a$ is $C(=O)$. In some embodiments, $R^a$ is $—(CH_2)_p—C(=O)$. In some examples $R^a$ is $—(CH_2)_p—C(=O)$ and p=6. In some examples $R^a$ is $—(CH_2)_p—C(=O)$ and p=5. In some examples $R^a$ is $—(CH_2)_p—C(=O)$ and p=4. In some examples $R^a$ is $—(CH_2)_p—C(=O)$ and p=3. In some examples $R^a$ is $—(CH_2)_p—C(=O)$ and p=2. In some examples $R^a$ is $—(CH_2)_p—C(=O)$ and p=1.

In some embodiments, $R^a$ is absent, $C(=O)$, $—(CH_2)_p—C(=O)$ and p is 1, 2, 3, 4, 5, or 6. In some embodiments, $R^a$ is absent, $C(=O)$, $—(CH_2)_3—C(=O)$ or $—(CH_2)_4—C(=O)$.

In some embodiments, $R_1$, $R_2$ and $R_3$ are each $(C(OH))$.

In some examples, the monomeric unit is having a structure represented by Formula (VII):

(VII)

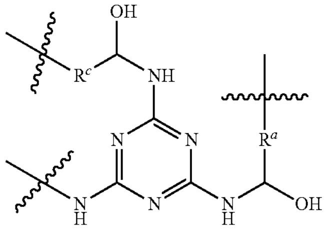

In some embodiments, $R^a$ is absent. In some embodiments, $R^a$ is C(OH), $R^b$ is C(OH) and $R^c$ is C(OH). In some embodiments, $R^a$ is —$(CH_2)_p$—C(OH), $R^b$ is —$(CH_2)_p$—C(OH), $R^c$ is —$(CH_2)_p$—C(OH). In some examples $R^a$ is —$(CH_2)_p$—C(OH) and p=6. In some examples $R^a$ is —$(CH_2)_p$—C(OH), $R^b$ is —$(CH_2)_p$—C(OH), $R^c$ is —$(CH_2)_p$—C(OH) and p=5.

In some examples $R^a$ is —$(CH_2)_p$—C(OH), $R^b$ is —$(CH_2)_p$—C(OH), $R^c$ is —$(CH_2)_p$—C(OH) and p=4. In some examples $R^a$ is —$(CH_2)_p$—C(OH), $R^b$ is —$(CH_2)_p$—C(OH), $R^c$ is —$(CH_2)_p$—C(OH) and p=3. In some examples $R^a$ is —$(CH_2)_p$—C(OH), $R^b$ is —$(CH_2)_p$—C(OH), $R^c$ is —$(CH_2)_p$—C(OH) and p=2. In some examples $R^a$ is —$(CH_2)_p$—C(OH), $R^b$ is —$(CH_2)_p$—C(OH), $R^c$ is —$(CH_2)_p$—C(OH) and p=1.

In some embodiments, the monomeric unit is having a structure represented by Formula (VIII):

(VIII)

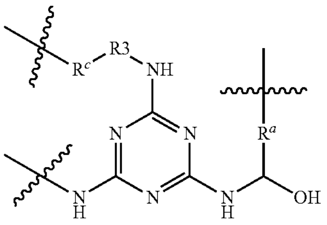

In some embodiments, $R_2$, $R_3$ $R^b$, $R^c$ are each absent, $X_1$, $X_2$ and $X_3$ are each H and C is H.

In some embodiments, the monomeric unit is having a structure represented by Formula (IX):

(IX)

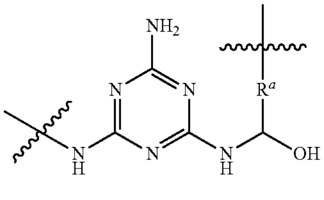

In some embodiments, $R^a$ is absent. In some embodiments, $R^a$ is C(OH). In some examples $R^a$ is —$(CH_2)_p$—C(OH) and p=6. In some examples $R^a$ is —$(CH_2)_p$—C(OH), $R^b$ is —$(CH_2)_p$—C(OH), $R^c$ is —$(CH_2)_p$—C(OH) and p=5. In some embodiments, $R_1$ is $(CH_2)_m$. In some embodiments, wherein $R_1$ is $(CH_2)$.

In some embodiments, the monomeric unit having a structure represented by Formula (X):

(X)

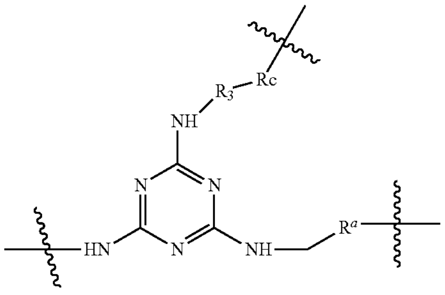

In some embodiments, $R^3$ is C(OH).

In some embodiments, $R^3$ is $CH_2$.

In some embodiments, the monomeric unit having a structure represented by Formula (XI):

(XI)

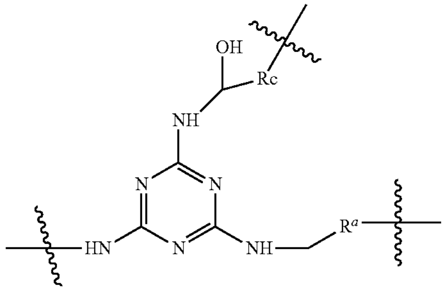

In some embodiments, $R^c$ is absent, C(OH), —$(CH_2)_p$—C(OH) and p is 1, 2, 3, 4, 5, or 6. In some embodiments, $R^c$ is absent, C(OH), $(CH_2)_3$—C(OH) or $(CH_2)_4$—C(OH). In some embodiments, each of $R_3$ and $R^e$ is absent. In some embodiments, C is H.

In some embodiments, the monomeric unit having a structure represented by Formula (XIa):

(XIa)

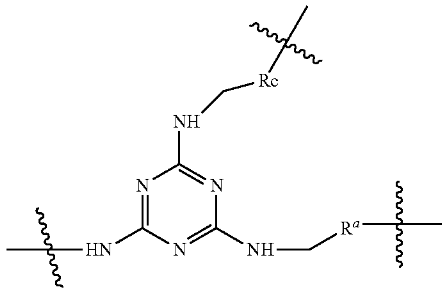

In some embodiments, $R^c$ is absent, $(NH—(CH_2))_p$ and p is 1, 2, 3, 4, 5, or 6. In some embodiments, $R^c$ is $(NH—(CH_2))_3$, $(NH—(CH_2))_3$.

In some embodiments, the monomeric unit is having a structure represented by Formula (XII):

(XII)

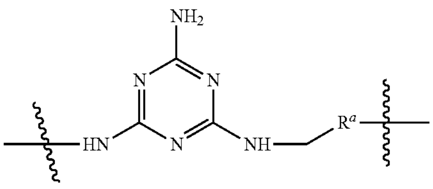

In some embodiments, $R^a$ is absent or $-O(CH_2)_p-$, $(-OCH_2-NH-C(=O)-NH-CH_2O-CH_2)_p$, $(-NH-C(=O)-NH-CH_2)_p$.

In some examples, the monomeric unit having a structure represented by Formula (XIII):

(XIII)

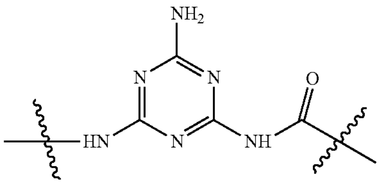

The compound comprising at least two monomeric unit having a structure represented by Formula (XIII) is at times denoted as APC-002.

In some examples, the monomeric unit is having a structure represented by Formula (XIV):

(XIV)

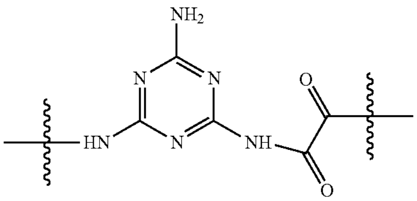

The compound comprising at least two monomeric unit having a structure represented by Formula (XIV) is at times denoted as APC-003.

In some examples, the monomeric unit is having a structure represented by Formula (XV):

(XV)

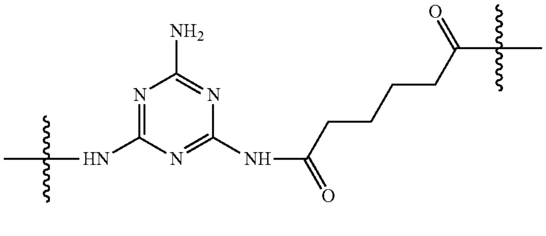

In some examples, the monomeric unit is having a structure represented by Formula (XVI):

(XVI)

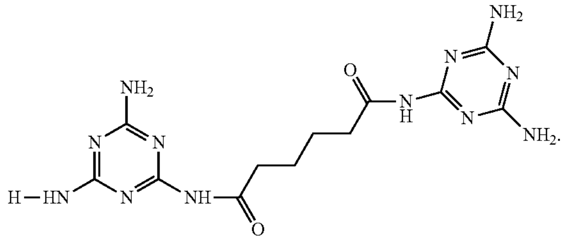

The compound comprising at least two monomeric unit having a structure represented by Formula (XV) and/or Formula (XVI) is at times denoted as APC-004.

In some examples, the monomeric unit is having a structure represented by Formula (XVII):

(XVII)

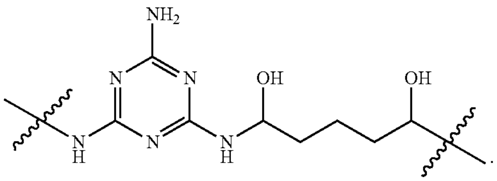

In some examples, the monomeric unit is having a structure represented by Formula (XVIII):

(XVIII)

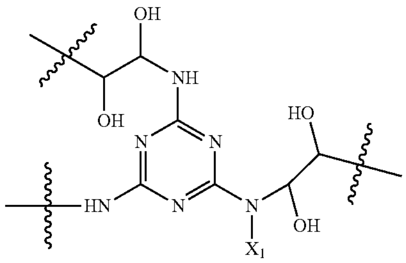

In some examples, the compound comprising two or more monomeric unit having a structure represented by Formula (XVIII), B is $C(OH)_m-CH_3$ or $C(OH)_m-H$.

In some examples, the compound comprising the monomeric unit having a structure represented by the Formula (XVIII), wherein $X_1$ is $CH_3$ and B is $-C(OH)-C(OH)-CH_3$ is at times denoted as APC-00010.

In some examples, the monomeric unit is having a structure represented by Formula (XVIIIa):

(XVIIIa)

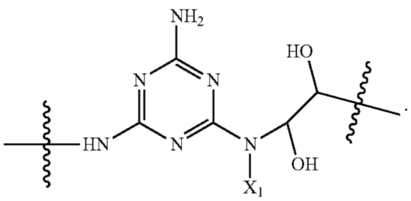

In some embodiments, the compound having a structure represented by Formula (Ia):

(Ia)

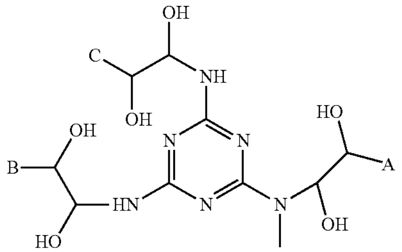

In some examples, the monomeric unit is having a structure represented by Formula (XIV):

(XIV)

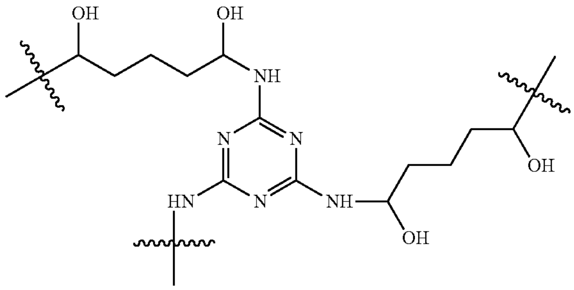

In some examples, the compound comprising the monomeric unit having a structure represented by the Formula (XIV) is at times denoted as APC-009.

In some examples, the compound comprising two or more monomeric unit having a structure represented by Formula (XIV), B is C(OH)—$(CH_2)_p$—C(OH)—H.

In some examples, the compound comprising two or more monomeric unit having a structure represented by Formula (XIV), B is C(OH)—$(CH_2)_p$—C(OH)—H is at times denoted as APC-00009.

In some examples, the monomeric unit is having a structure represented by Formula (XIVa):

(XIVa)

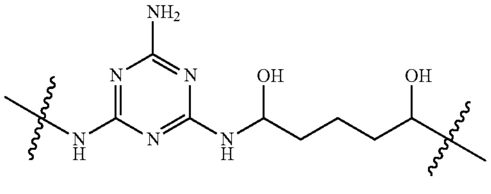

In some embodiments, the compound having a structure represented by Formula (Ib):

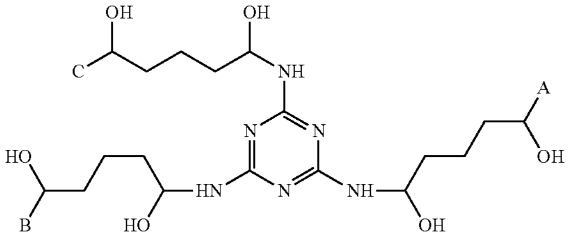

In some embodiments, the monomeric unit is having a structure represented by Formula (XX), (XXa) or (XXb):

(XX)

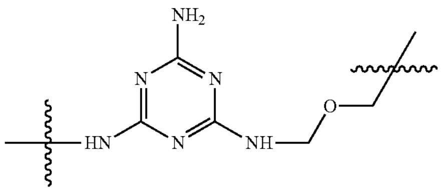

, (XXa)

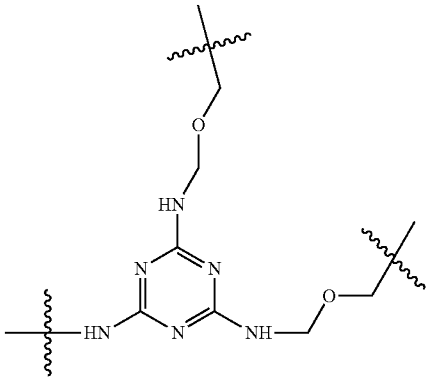

or (XXb)

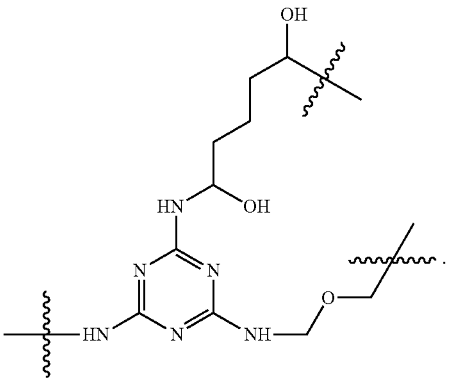

.

In some embodiments, the monomeric unit is having a structure represented by Formula (XXI), (XXIa) or (XXIb):

(XXI)

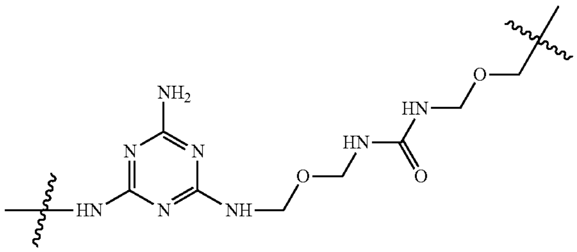

(XXIa)

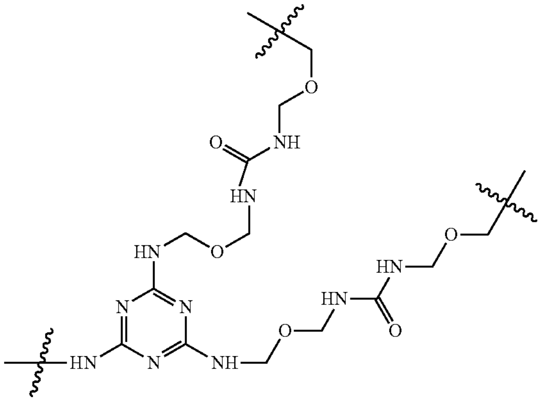

or (XXIb)

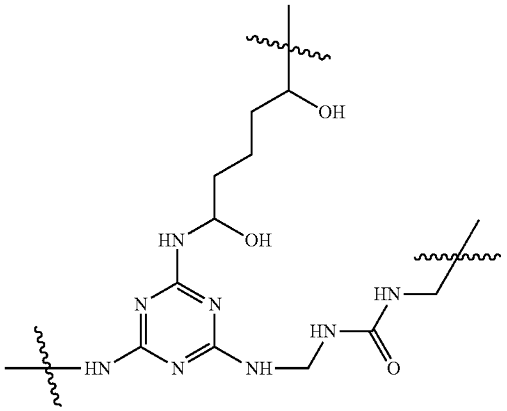

In some embodiments, the monomeric unit is having a structure represented by Formula (XXII):

(XXII)

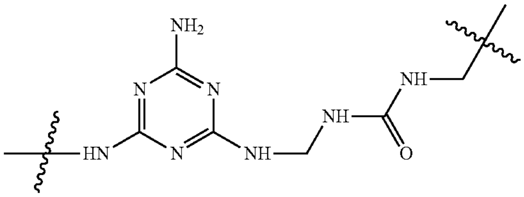

In some examples, the compound having a structure represented by at least one of the Formula (XX), (XXI) and (XXII) is at times denoted as APC-008.

In some embodiments, the monomeric unit is having a structure represented by Formula (XXIII):

(XXIII)

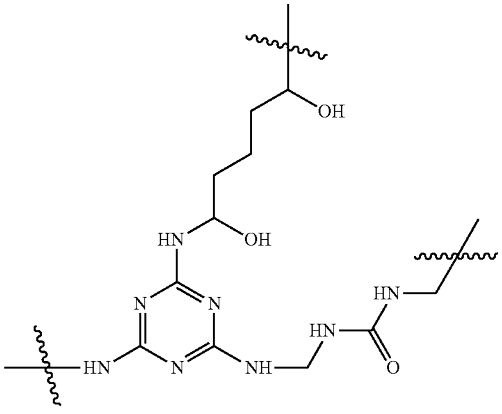

In some embodiments, the monomeric unit is having a structure represented by Formula (XXIV):

(XXIV)

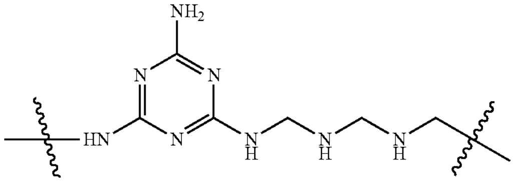

In some embodiments, the monomeric unit is having a structure represented by Formula (XXV):

(XXV)

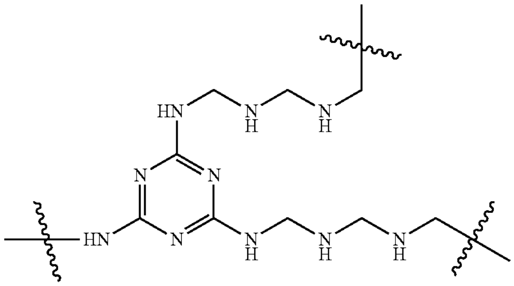

In some embodiments, A, B, C is each independently selected from H or

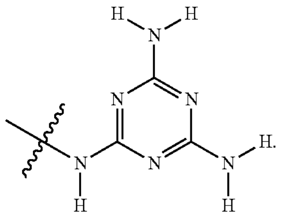

In some embodiments, A is H or

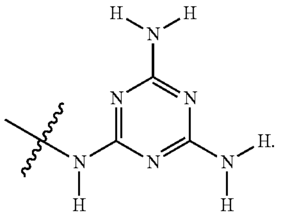

In some embodiments, B is H.

In some embodiments, C is H.

In some examples, the melamine-based compound comprising at least two monomeric units, wherein each one of the at least two monomeric unit having a structure represented by Formula II-XXV.

In some examples, the melamine-based compound comprising at least two monomeric units, wherein each one of the at least two monomeric unit having a structure represented by Formula XIII-XXV.

In some examples, representative melamine-based compounds are provided in Table 1.

TABLE 1

Representative melamine-based compound

| Name | Monomeric Unit |
|---|---|
| P2/APC-0002 | XIII |
| P3/APC-0003 | XIV |
| P4/APC-0004 | XVI |
| P8/APC-0008 | (XX), (XXI) and (XXII) |
| P9/APC-0009 | XIV |
| P10/APC-00010 | XVIII |

In some examples, the melamine-based polymer is at least one polymer provided in Table 1.

In some embodiments, the melamine-based compounds, i.e. melamine based monomeric unit or melamine-based polymer of the present disclosure is essentially free of a halogen atom.

In some embodiments, the melamine-based compounds, i.e. melamine based monomeric unit or melamine-based polymer does not comprise a halogen atom.

In some embodiments, the melamine-based compounds, i.e. melamine based monomeric unit or melamine based polymer is not an N-halamine polymer.

In some embodiments, the melamine-based compound represented by Formula II-XXV excluding a compound having $X_1$=H, $X_2$=H, $X_3$=H, A=H, B=H, C=H, $L_1$=absent, $L_2$=absent and $L_3$=absent.

In accordance with some other aspects, the present disclosure relates to a population of polymers comprising a mixture of polymers, having the same or different monomeric units as detailed herein. It should be noted that at least two monomeric units are identical and connected by at least one of *, , *.

It should be further noted that when referring to a population of polymers, the polymers may vary and have different end groups (A, B, C). As appreciated, the end group may vary due to the polymerization reaction and hence polymers comprising identical monomeric units may have different end groups.

It should be further noted that the population of polymers comprise homopolymers, each having a different monomeric unit. Hence, the population of polymer comprises at times a mixture of a homopolymer (with or without different end groups) or a mixture of different homopolymers (each with or without different end groups).

As shown in the Examples below, the polymer has no biocide activity (i.e. is essentially inert in terms of biocidal activity) and only after application of at least one biocide, a biocide activity is acquired.

As described herein, one of the unique features of the melamine-based compounds of the present disclosure is their ability to act as a carrier (delivery system) for at least one biocide. By carrying the biocide, the melamine-based compound, including the polymer allows stabilization of the biocide and/or allows unique release profiles of the biocide. For example, evaporation of biocide, including, inter alia, hypochlorite or hydrogen peroxide from the melamine-based compounds, e.g. polymer is lower as compared to evaporation of hypochlorite or hydrogen peroxide from control samples. In addition, application biocide, including, inter alia, hypochlorite and/hydrogen peroxide on the melamine-based compounds, e.g. polymer resulted in immediate activity and prolong activity.

In some embodiments, the melamine-based compounds, e.g. polymer acts as an adjuvant for the at least one biocide. The adjuvant activity is reflected for example by stabilization of the biocide as determined by reduced evaporation or vanishing rate. In addition, the adjuvant activity is reflected by a dual biocidal activity including both an immediate biocide activity and prolong biocide activity. Hence, when referring to the polymer of the disclosure as an adjuvant of the at least one biocide it is to be understood as the polymer having at least one of (i) stabilizing effect on the biocide (ii) increasing biocide activity by at least one of duration and activity.

Without being bound by theory, it was suggested that the polymer of the present disclosure is in a form of a polymeric matrix holding (entrapping, embedding) at least one biocide.

As described herein, the major interactions between the polymer and the at least one biocide are non-covalent interactions (i.e. a bond that does not involve sharing of electrons).

In some embodiments, the interactions between the polymer and the at least one biocide include at least one of electrostatic interactions, dipole-dipole, hydrogen bonding, halogen bonding, π-π interactions and van der Waals interactions.

In some embodiments, the interactions between the polymer and the at least one biocide are electrostatic interactions.

In some embodiments, the interactions between the polymer and the at least one biocide are at least one of ionic interactions, hydrogen bonding, halogen bonding or any combination thereof.

In some embodiments, the interactions between the polymer and the at least one biocide are ionic interactions.

As shown herein, the polymer has multiple nitrogen atoms and in accordance with some embodiments, having a net positive charge.

There are a variety of biocides that are suitable and compatible with the polymer of the disclosure.

The term "biocide" as used herein refers to a chemical or biological substance capable of preventing the growth of a germ (microorganism) at times by killing the germ as well as destroying, deterring, rendering harmless, or exerting a controlling effect on any harmful microorganism. A biocide is at times refers to as a disinfectant.

In accordance with the preset disclosure the at least one biocide can be effective for a variety of microbes. In some embodiments, the microbe is at least one of a bacteria, an archaea, yeast, a fungi, a protozoa, an algae and a virus.

In accordance with some embodiments, the at least one biocide is a negatively charged biocide, a polar biocide, an electronegative biocide, or any combination thereof.

In some embodiments, the at least one biocide is capable upon contact with an aqueous solution (e.g. water), to release negatively charged ions, or those having a partial negative charge (by dipole or polarization), i.e., having —C(O)—, —OH, —O—, peroxide group, $—S(O)_n$, $—P(O)_n$, $N(O)_n$ In some embodiments, the at least one biocide is at least one of a chloride-based biocide, a bromide-based biocide, an iodide-based biocide or hydrogen peroxide, or a preservative.

In some examples, the at least one biocide which, upon contact with an aqueous solution, release negatively charged ions is at least one of a halide-based biocides.

Non-limiting examples of a halide-based biocide include a chloride-based biocide, a bromide-based biocide, an iodide-based biocide, or combination thereof.

In some embodiments, the biocide is at least one of a hypochlorite ($ClO^-$) ions. hypochlorite ions are typically considered as an unstable compound. Surprisingly, and as shown in the examples below, application of $ClO^-$ on the melamin-based polymers of the present disclosure reduced evaporation rate of $ClO^-$. It was suggested that the polymer stabilized $ClO^-$ and enabled its prolonged activity. The w/w % of stabilized $OCl^-$ in polymeric matrix may reach more than 65% from total weight of melamine-based polymer.

A hypochlorite ion can be provided by a hypochlorous acid salt (e.g., sodium hypochlorite and calcium hypochlorite), or a dichloroisocyanuric acid salt, (e.g., sodium dichloroisocyanurate, sodium dichloroisocyanurate dihydrate, and potassium dichloroisocyanurate dihydrate).

In some embodiments, the bromide-based biocide is at least one of hypobromite ($BrO^-$) ions. A hypobromite ion can be provided by a hypobromous acid salt (e.g., sodium hypobromite and calcium hypobromite), or a dibromoisocyanuric acid salt, (e.g., sodium dibromoisocyanurate).

In some embodiments, the iodide-based biocide is at least one of hypoiodite ($IO^-$) ions. A hypoiodite ($IO^-$) ion can be provided by hypoiodous acid salt (e.g., sodium hypoiodite). In certain embodiments, the biocide referred to herein is a halide-based biocide, preferably a chloride-based biocide.

In some examples, the biocide is hydrogen peroxide. Hydrogen peroxide is typically considered as an unstable compound. Surprisingly, and as shown in the examples below, application of at least <5% (w/w) hydrogen peroxide provides high biocidal activity to the treated surface, comprises melamine-based polymer.

In some examples, the biocide is a preservative. In some examples, the preservative is at least one of ascorbic acid or a salt thereof. In some examples, the preservative is sodium ascorbate.

Examples of biocides which possess a partial negative charge in their structure include, without limiting, organic acids such as propionic acid and benzoic, as well as their esters and salts (e.g., sodium propionate, calcium propionate and sodium benzoate); peroxide-derived compounds; alcohols; aldehydes; acid/peroxide derivatives of amines (e.g., amino acids); acid nitrites, nitrates, sorbates (e.g. potassium sorbates), ionic silver and nanosilver; oxidizing agent; isothiazolinone; phenol, and biguanides.

In some aspects which may be implemented as embodiments of the disclosure, it is provided a melamine-based compound for use as a carrier for at least one biocide. In some embodiments, the melamine-based compound comprises one monomeric unit (i.e. no polymerization at *,  and *). In some aspects which may be implemented as embodiments of the disclosure, it is provided a melamine-based monomeric unit for use as a carrier for at least one biocide.

In some aspects which may be implemented as embodiments of the disclosure, it is provided a melamine-based polymer for use as a carrier for at least one biocide.

In some other aspects, which may be implemented as embodiments of the disclosure, it is provided a melamine-based monomeric unit or a melamine-based polymer for use as an adjuvant for at least one biocide.

In some other aspects, which may be implemented as embodiments of the disclosure, it is provided a melamine-based compound, melamine-based monomeric unit or a melamine-based polymer for use as a controlled release system for use as a disinfecting agent for disinfecting surfaces and specifically contaminated surfaces as described herein.

In accordance with some other aspects, the present disclosure provides, a melamine-based compound having a structure represented by Formula (I):

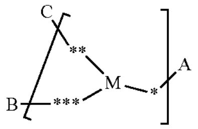

wherein M is a melamine-based monomeric unit, *, , * denote polymerization points, n denote the number of * and is selected from 0 to 100, q denote the number of  and is selected from 0 to 100, r denote the number of * and is selected from 0 to 100, and wherein A, B and C are end groups and each is independently selected from OH, H,

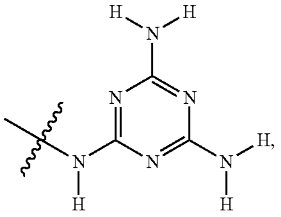

$—C(OH)—H_2$, —C(═O)—H, —C(═O)—OH, $—CH_3$, optionally substituted alkyl, optionally substituted cycloalkyl, optionally substituted hetcrocyclyl, optionally substituted aryl, optionally substituted heteroaryl, $(C(OH))_m$, $(C(OH))_m—(O═CH_2)_p$, $(C(OH))_m—(OCH_2—NH—C(═O)—NH—CH_2OCH_2—)_p$, $(C(OH))_m—(—NH—C(═O)—NH—CH_2)_p$, $(C(OH))_m—(C(═O))_p$, $(C(OH))_m—(CH_2)_p—C(═O)$ or $(C(OH))_m—(CH_2)_p—C(OH)$ for use as a carrier of at least one biocide.

In some embodiments, the compounds is for use as an adjuvant for at least one biocide. In some embodiments, n is 0, q is 0 and r is 0. In some embodiments, n+q+r is 0. In some embodiments, n+q+r is 1. In some other embodiments, the melamine-based monomeric unit having a structure represented by at least one of Formula II-XXV.

The at least one biocide can be applied on the melamine-based compound, i.e. monomeric unit or polymer per se (e.g. in a form of a particular matter) or can be applied to a product comprising the melamine-based compound.

Hence, in accordance with some other aspects, the present disclosure provides a product comprising the melamine-based compound and at least one product specific substance.

In some embodiments, the product comprises at least one polymer comprising at least two monomeric units, wherein each one of the at least two monomeric unit having a structure represented by Formula II-XXV.

In some examples, the product comprises at least one polymer comprising at least two monomeric units, wherein each one of the at least two monomeric unit having a structure represented by Formula XIII-XXV.

In some examples, the product comprises at least one polymer as described in Table 1.

In some embodiments, the product comprises at least one monomeric unit having a structure represented by Formula II-XXV.

In some examples, the product comprises at least one monomeric unit having a structure represented by Formula XIII-XXV.

There are a variety of products that can be prepared from the polymers of the present disclosure, including, inter alia, paint and coating formulations, electrospray powder coatings or plastic products.

In accordance with some aspects, the present invention provides a composition comprising a paint, varnish, wax, or polymerizable monomers or a crosslinkable/curable polymer for making plastic or resin products or coatings (both hard/solid and flexible), wherein the composition further comprises a melamine-based polymer also denoted as an antiseptic precursor compound (APC) capable of interacting with (i.e., binding or attaching) a biocide, the melamine based polymer is at least one polymer having a structure represented by Formula I or comprising at least two monomeric units, wherein each one of the at least two monomeric unit having a structure represented by Formula II-XXV or at times a polymer having the formula XXX, XXXI, or XXXII:

(XXX)

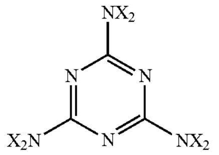

(XXXI)

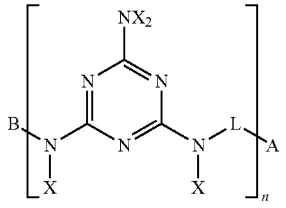

(XXXII)

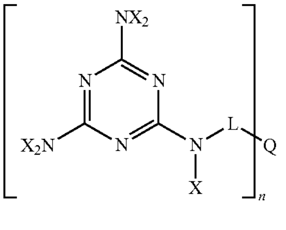

or a salt thereof, wherein

X each independently is H, —C(O)-alkyl, —C(O)-alkenyl, —C(O)-alkynyl, alkyl, alkenyl, alkynyl, cycloalkyl, heterocyclyl, aryl, heteroaryl, —COOH, or -L-Y;

L is absent, or a linker selected from $L_1$ or —C(O)-$L_2$-C(O)—;

$L_1$ is selected from —CO—, alkylene, alkenylene, alkynylene, cycloalkylene, or cycloalkenylene, wherein said alkylene, alkenylene and alkynylene each is optionally interrupted by one or more groups each independently selected from —O—, —CO—, —NH—, —S—, —CO—NH—, —NH—CO—, arylene, or heteroarylene;

$L_2$ is absent, or selected from alkylene, alkenylene, alkynylene, cycloalkylene, cycloalkenylene, arylene, or heteroarylene, wherein said alkylene, alkenylene and alkynylene each is optionally interrupted by one or more groups each independently selected from —O—, —CO—, —NH—, —S—, —CO—NH—, —NH—CO—, arylene, or heteroarylene;

A each independently is H, —OH, —C(O)-alkyl, —C(O)-alkenyl, —C(O)-alkynyl, alkyl, alkenyl, alkynyl, cycloalkyl, heterocyclyl, aryl, heteroaryl, or —Y;

B is X or -L-A;

Y is a group of the formula:

(Y)

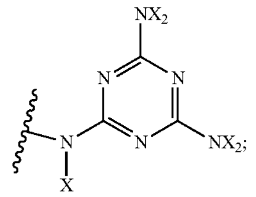

R is an aliphatic chain, aliphatic ring, heterocyclic ring, aromatic ring, or heteroaromatic ring, wherein said aliphatic chain is optionally interrupted by one or more groups each independently selected from —O—, —CO—, —NH—, —S—, —CO—NH—, —NH—CO—, arylene, or heteroarylene; and n is an integer of at least 1, e.g., of up to 20, 30, 40, 50, 60, 80, 100, 200, 300, 400, or 500, provided that L may be absent only when said APC has the formula XXXIII; and R is an aliphatic chain, aliphatic ring, or heterocyclic ring.

In some embodiments, the at least one product specific substance is at least one a polymer (denoted herein as "second polymer"), a powder mixture, an adhesive, a sealant, a pigment, a varnish or a wax.

There is a variety of second polymers that can be used according to the present disclosure. The second polymer can be a synthetic polymer or a natural polymer.

In some embodiments, the at least one second polymer comprises polymerizable monomer, cross linkable polymer or curable polymer.

In some embodiments, the second polymer is at least one of polystyrene, polyamide, polyethyleneimine, polycarbonate, polyolefin, styrene-acrylonitrile, acrylonitrile-butadiene-styrene, polyester, polyurethane, epoxide, polyphenylene ether, halogen-substituted organic polymer, phthalic acid amide, polyphenylene sulfide, liquid crystal polymers, polyethylene terephthalate cyclohexane, silicone-based polymers (polysiloxane, sol-gels, rubbers etc), 3D printable formulations of polymers and combinations thereof.

In some embodiments, the second polymer is a resin.

In some embodiments, the resin is a natural resin. In some embodiments, the resin is a synthetic resin.

In some embodiments, the polymer of the present disclosure a particulate matter comprising the polymers of the present disclosure.

In some embodiments, the particulate matter comprises at least one second polymer.

In some embodiments, the at least one second polymer comprises a thermoplastic polymer (e.g. polymers that are pliable or moldable upon specific heating and solidify upon cooling). In some embodiments, the at least one polymer is or comprises a polyolefin and/or polystyrene.

In some embodiments, the at least one second polymer is or comprises one or more polyolefins.

In some embodiments, the polyolefin is selected from the group consisting of high density polyethylene (HDPE), linear low density polyethylene (LLDPE), low density polyethylene (LDPE), medium-density polyethylene (MDPE), ethylene-vinyl acetate (EVA) copolymer, ethyl methyl acrylate (EMA) copolymer, polypropylene copolymer (CPP), polypropylene homopolymer (HPP), random polypropylene copolymer (RPP), their derivatives and mixtures thereof.

In some embodiments, the at least one second polymer is or comprises a polyethylene-based polymer.

In some embodiments, the polyethylene-based polymer is or comprises HDPE, LLDPE, LDPE, MDPE, EVA copolymer, (EMA) copolymer, their derivatives and mixtures thereof.

In some embodiments, the at least one polymer is LDPE.

In some embodiments, LLDPE is or comprises metallocene linear low density polyethylene (mLLDPE).

In some embodiments, the at least one polymer is a polypropylene-based polymer.

In some embodiments, the polypropylene-based polymer is or comprises CPP, HPP, RPP, their derivatives and mixtures thereof.

In some embodiments, the at least one polymer is HPP.

In some embodiments, the product is a paint formulation, an ink formulation a coating, a varnish or a wax. In some embodiments, the product is powder coating. In some other embodiments, the product is a bulk polymer. In some other embodiments, the product is a flexible polymer. In some other embodiments, the product is a laminate. In some other embodiments, the product is an adhesive. In some other embodiments, the product is a sealant.

In some other embodiments, the product is a plastic product. The plastic product can be elastic or non-elastic product. In some other embodiments, the product is a film. In some embodiments, the product is a fiber. In some embodiments, the product is a non-woven fabric.

In some embodiments, the product is a formulation that can be used to coat at least one surface. There are a variety of surfaces that can be coated with the formulation comprising the polymer of the present disclosure. Such surfaces include medical but also non-medical surfaces.

The surfaces can be surfaces in clean rooms or public rooms, transportation, and the like. In addition, the surfaces can be any packing in the food industry.

In some embodiments, the surface is metal surface, wood surface, plastic surface, ceramic surface, glass surface, tiles, textile surface or combination thereof.

As detailed herein, the polymers of the disclosure have no biocide activity and acquire activity upon application of the at least one biocide.

In accordance with some other aspects, it is provided a method for controlling growth of at least one microbial, the method comprising: applying at least one biocide on the polymers or a product comprising the same, to thereby reduce the growth of at least one microbial. Controlling the growth is to be understood as any action that negatively affects the growth of at least one microbial.

Hence, the present disclosure provides a method for reducing or eliminating growth of at least one microbial, the method comprises applying an effective amount of at least one biocide on a melamine-based compound, melamine-based polymer, a population of polymers or a product comprising the same, wherein the compound having a structure represented by Formula (I) or comprising at least two monomeric units, wherein each one of the at least two monomeric unit having a structure represented by Formula II-XXV.

In some embodiments, the at least one biocide is applied on a surface coated with the product. In some aspects which can be implemented as embodiments of the invention, it is provided a method for reducing or eliminating growth of at least one microbial, the method comprises applying an effective amount of a compound, a polymer, a population of polymers or a product comprising the same, on a surface, wherein the compound having a structure represented by Formula (I) or the polymer comprising at least two monomeric units, wherein each one of the at least two monomeric unit having a structure represented by Formula II-XXV, to thereby reduce or eliminate growth of at least one microbial.

In some examples, the polymer is a polymer having a structure represented by Formula (I) or comprising at least two monomeric units, wherein each one of the at least two monomeric unit having a structure represented by Formula II-XXV.

In some examples, the polymer is at least one polymer described in Table 1.

In some embodiments, the at least one biocide is applied on a polymeric fiber, film, flexible or hard polymeric product, laminate, or non-woven fabric. In some aspects which can be implemented as embodiments of the invention, it is provided a method for reducing or eliminating growth of at least one microbial, the method comprises applying an effective amount of a polymer, a population of polymers or a product comprising the same, on a polymeric fiber, film, flexible or hard polymeric product, laminate, or non-woven fabric, wherein the polymer is a polymer having a structure represented by Formula (I) or comprising at least two monomeric units, wherein each one of the at least two monomeric unit having a structure represented by Formula II-XXV, to thereby reduce or eliminate growth of at least one microbial.

In some examples, the polymer comprising at least two monomeric units, wherein each one of the at least two monomeric unit having a structure represented by Formula XIII-XXI.

In some examples, the polymer is at least one polymer as described in Table 1.

Figure 1B:
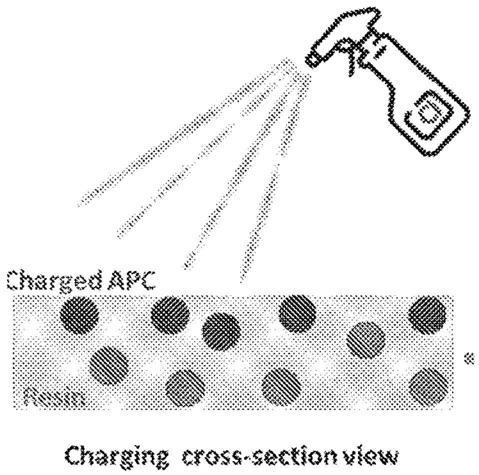
Figure 1C:
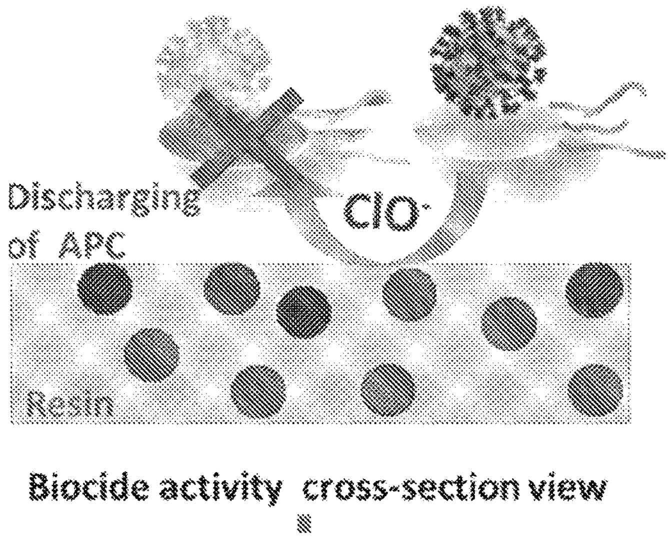

As schematically shown in FIG. 1, a product such as a plastic product formed from a polymer of the disclosure (also dented herein as APC), or a surface is coated with an APC-containing formulation is activated with a biocide (e.g., hypochlorite). The biocide is attached to the polymer as described herein (sometimes refers herein to charging), for example the biocide attaches to the polymer on the surface by non-covalent interactions, including, inter alia, ionic interactions. An antimicrobial activity takes place. It should be noted that as described herein, the biocide may be active for repeated bacterial loading. After the biocidal activity is terminated, reapplication of the polymer can take place (sometimes refers herein as recharging). The activity can be prolonged up to days, weeks and even months, depending on the product type.

In some embodiments, the methods comprising applying the at least one biocide by spraying, brushing, fogging, wiping, dipping or any combination thereof.

In some embodiments the microbial is at least one of a bacterium, a virus, a yeast, a fungi, a protozoa, a protozoa, an algae, an archaea, their toxins or by-products In some embodiments, the bacterium is a gram-negative bacterium. In some other embodiments, the bacterium is a gram-positive bacterium.

It should be noted that the present disclosure also encompasses spores and toxins.

In some embodiments, the bacterium is at least one of *Escherichia coli, Pseudomonas aeruginosa, Pseudomonas fluorescens, Pseudomonas putida, Chlamydia trachomatis, Acinetobacter calcoaceticu, Halomonas marina, Yersinia pestis, Listeria monocytogenes, Staphylococcus epidermidis, Streptococcus mutans, Streptococcus thermophiles, Staphylococcus aureus, Salmonella Enterica* or *Bacillus subtilis.*

In some embodiments, the fungi is *Aspergillus brasiliensis* or *Aspergillus niger.*

In some embodiments, the microbial is a yeast. In some examples, the microbial is *Saccharomyces cerevisiaea.*

In some embodiments, the m microbial is a virus. The virus maybe an RNA virus or a DNA virus.

Non-limiting examples of a pathogenic virus families include Adenoviridae, Picornaviridae, Herpes simplex virus (HSV), Herpesviridae, Hepadnaviridae, Flaviviridae, Retroviridae, Orthomyxoviridae, Paramyxoviridae, Papovaviridae, Polyomavirus, Rhabdoviridae, Corona or Togaviridae. In some embodiments, the virus is at least one Coronavirus.

In some embodiments, the Coronavirus is at least one of Severe acute respiratory syndrome (SARS), Middle East respiratory syndrome (MERS), and SARS-COV-2.

In some embodiments, the virus is SARS-COV-2.

As used herein the term "alkyl" refers to a linear, branched saturated hydrocarbon having from 1 to 20 carbon atoms (i.e., $C_1$-$C_{20}$ alkyl), at times from 1 to 12 carbon atoms, at times from 2 to 8 carbon atoms, at times from 2 to 6 carbon atoms, at times from 2 to 5 carbon atoms, at times from 1 to 3 carbon atoms. As used herein the term "alkylene" refers to a linear, branched saturated hydrocarbon having from 1 to 20 carbon atoms (i.e., $C_1$-$C_{20}$ alkyl), at times from 1 to 12 carbon atoms, at times from 2 to 8 carbon atoms, at times from 2 to 6 carbon atoms, at times from 2 to 5 carbon atoms, at times from 1 to 3 carbon atoms. It should be noted that alkyl refers to an alkyl end chain and alkylene refers to a middle chain alkyl. Representative $C_1$-$C_{12}$ alkyl and alkylene groups include, but are not limited to, methyl, ethyl, propyl, isopropyl, cyclopropyl, butyl, sec-butyl, isobutyl, tert-butyl, cyclobutyl, pentyl, iso-pentyl, neo-pentyl, tert-pentyl, cyclopentyl, hexyl, cyclohexyl, heptyl, cycloheptyl, octyl, sec-octyl (1-methylheptyl), and cyclooctyl.

The term "alkenyl" as used herein refers to a linear (straight), branched unsaturated hydrocarbon having from 2 to 20 carbon atoms and at least one carbon-carbon double bond. The term "$C_2$-$C_{12}$ alkenyl" or "$C_2$-$C_{12}$ alkenylene" as used herein refers to a linear, branched unsaturated hydrocarbon having from 2 to 12 carbon atoms and at least one carbon-carbon double bond, in some embodiments from 3 to 8 carbons, in yet some further embodiments, from 3 to 5 carbon atoms and at least one double bond. It should be noted that alkenyl refers to an alkyl end chain and alkenylene refers to a middle chain alkyl.

The term "alkynyl" as used herein refers to a linear, branched unsaturated hydrocarbon having from 2 to 20 carbon atoms and at least one carbon-carbon triple bond. The term "$C_2$-$C_{12}$ alkynyl" or "$C_2$-$C_{12}$ alkynylene" as used herein refers to a linear, branched unsaturated hydrocarbon having from 2 to 12 carbon atoms in certain embodiments, from 3 to 8 carbons, and at least one triple bond (at least one carbon-carbon triple bond). It should be noted that alkynyl refers to an alkyl end chain and alkynylene refers to a middle chain alkyl.

As used herein, "aryl" refers to aromatic ring systems having between 5 to 12 atoms. Unless otherwise specifically defined, the term "aryl" refers to cyclic, aromatic hydrocarbon groups that have 1 to 2 aromatic rings, including monocyclic or bicyclic groups having between 5 to 12 atoms. Non-limiting examples include phenyl, biphenyl or naphthyl. The aryl group may be optionally substituted by one or more substituents, e.g., 1 to 5 substituents, at any point of attachment. The substituents can themselves be optionally substituted. As used herein, "$C_5$-$C_{12}$ aromatic" refers to aromatic ring systems having 5 to 12 carbon atoms, such as phenyl, naphthalene and the like.

As used herein, the term "heteroaryl" refers to aryls as defined above where one or more carbons are substituted by heteroatoms. Exemplary heteroatoms include, but not limited to, nitrogen, sulfur, and oxygen. As used herein, "heteroaromatic" refers to refers to a monocyclic or multi-cyclic (fused) aromatic ring system, where one or more of the atoms in the ring system is a heteroatom, that is, an element other than carbon, including but not limited to, nitrogen, oxygen or sulfur. The term "heteroaromatic" used interchangeably with the term "heteroaryl" denotes a heterocyclic aromatic ring systems containing 5 to 12 atoms, with at least one, preferably two carbon atoms and one or more heteroatoms selected from nitrogen, oxygen and sulfur. Non-limiting examples include furan, thipohene, pyrrole, oxazole, thiazole, imidazole, pyrazole, isoxazole, thiazolem benzofurna, indole, benzothiophene, benzoimidazole, indazole, benzoxazole, benzoisoxazole, benzothiazole, isobenzfuran, isoidole, purine, pyridine, pyrazine, pyrimidine, pyrisazine, quinoline, quinozaline, quinazoline, isoquinoline, furyl, thienyl, pyrrolyl, oxazolyl, thiazolyl, imidazolyl, isoxazolyl, isothiazolyl, 1,2,3-triazolyl, 1,2,4-triazolyl, pyranyl, pyridyl, pyridazinyl, pyrimidinyl, pyrazinyl, 1,2,3-triazinyl, 1,2,4-triazinyl, 1,3,5-triazinyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, tetrazolyl, thiadiazinyl, indolyl, isoindolyl, benzofuryl, benzothienyl, indazolyl, benzimidazolyl, benzothiazolyl, benzoisothiazolyl, benzoxazolyl, benzisoxazolyl, purinyl, quinazolinyl, quinolizinyl, quinolinyl, isoquinolinyl, quinoxalinyl, naphthyridinyl, pteridinyl, carbazolyl, azepinyl, diazepinyl, acridinyl and the like.

The term "effective amount" is intended to mean that amount of a biocide is sufficient to cause a beneficiary change. The beneficiary change is at least one of preventing or reducing or eliminating the growth of the microorganism and/or killing the microorganism. A reduction is denoted as a lower amount of a microbial as compared to non-treated control by 10%, 12%, 15%, 20%, 30%, 40%, 50%, 60%, 70%, 80%, 90%, 95%, 99%.

The term "about" as used herein indicates values that may deviate up to 1%, more specifically 5%, more specifically 10%, more specifically 15%, and in some cases up to 20% higher or lower than the value referred to, the deviation range including integer values, and, if applicable, non-integer values as well, constituting a continuous range.

It is to be understood that the terminology used herein is used for the purpose of describing particular embodiments only and not intended to be limiting since the scope of the present invention will be limited only by the appended claims and equivalents thereof.

Throughout this specification and the Examples and claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The following examples are representative of techniques employed by the inventors in carrying out aspects of the present invention. It should be appreciated that while these techniques are exemplary of preferred embodiments for the practice of the invention, those of skill in the art, in light of the present disclosure, will recognize that numerous modifications can be made without departing from the spirit and intended scope of the invention.

NON-LIMITING EXAMPLES

Materials and Methods

Double distilled water (18 ohm/square) column was purchased from Treion (Israel). Melamine (99% purity), and acetic acid (99% purity) were purchased from Sigma-Aldrich (USA). Ethanol (ABS AR grade) was purchased from Gadot (Israel). Formic acid was purchased from Merck (Germany). Glutaraldehyde solution 50% purchased from Fisher Chemical (UK), Glyoxal solution purchased from Holland Moran, Alfa Aesar, UK, Formaldehyde (37% water, Sigma Aldrich), Urea (99%, Merck, Germany).

Example 1: Synthesis of Polyglutaraldehyde Melamine

The synthesis is shown in Scheme 1:325.0 gr melamine was added with 560 ml DDW to 2-liter 3 necks round-bottom flask reaction vessel connected to stirrer motor, pressure equalizing funnel, pH meter and thermometer. after a good stirring was achieved, the solution was titrated to pH=5-5.4 using formic acid. then, the reaction temperature was increased to 55-60° C., over 50 minutes. After the temperature was reached, within 12-16 minutes, using pressure equalizing funnel, add 808.8 gr total weight of glutaraldehyde solution (50%) portionwise. Follow by, the pressure equalizing funnel was washed using 50 ml DDW. The polymerization process proceeds until the end point (E.P) was reached, and pH value increase to 6.8-7.5. after the reaction reach the pH value, let the reaction to stir more 5 minutes, then, allow to cool down the reaction solution to the ambient temperature.

Then, the solid was filtered using Buchner funnel, and dried by a desiccator with silica-gel or oven (50° C.) for at least 12 h to obtain a 605 gr. white-bright yellow powder. FT-IR ν (cm-1): 3335, 3225 (N—H stretch); 3660-3000 (br, O—H stretch); 2940 (Aliphatic C—H stretch); 1580,1400 (1,3,5 s-triazine stretch); 1160 (C—OH stretch); 955, 890 (C—C stretch); 820 (1,3,5 s-triazine out of plane ring bend). 1H-NMR (500 MHz, DMSO-d6): 6.03 (s, N—H), 2.1-1.7 (m, CCH2), 1.7-1.2 (m, CCH2-CH2).

Scheme 1: Chemical synthesis of polyglutaraldehyde melamine

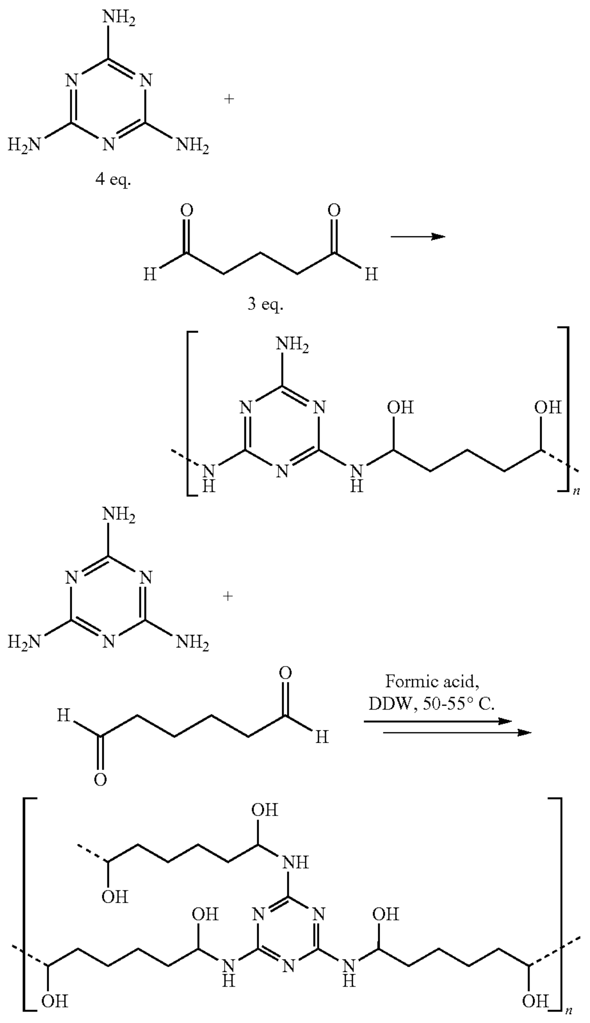

Polyglutaraldehyde melamine polymer comprises at least two monomeric units having a structure represented herein by Formula (XIV) and at times as P9 or APC-0009.

Example 2. Synthesis of Polyglyoxal Melamine

As depicted in scheme 2, 392.9 gr melamine was added with 649 gr total weight of glyoxal solution (40%) to 2-liter 3 necks round-bottom flask reaction vessel connected to stirrer motor, pH meter and thermometer. after a good stirring was achieved, the solution was basified to pH=9.5 using 48% NaOH solution (aq.) and the reaction temperature was increased to 60-63° C. After 5 minutes of heating, 400 ml DDW was added to reaction vessel and the heating was proceeded over more 35 minutes until 60° C. was reached. Then, the reaction solution was acidified by formic acid till pH=5.5 and the reaction were proceeded in 58° C.-63° C. for 2 hours. After completion, the reaction was allowed to cool to room temperature, and the product was filtered using a Buchner bicker under vacuum (6 mbar).

Scheme 2: Chemical synthesis of polyglyoxal melamine

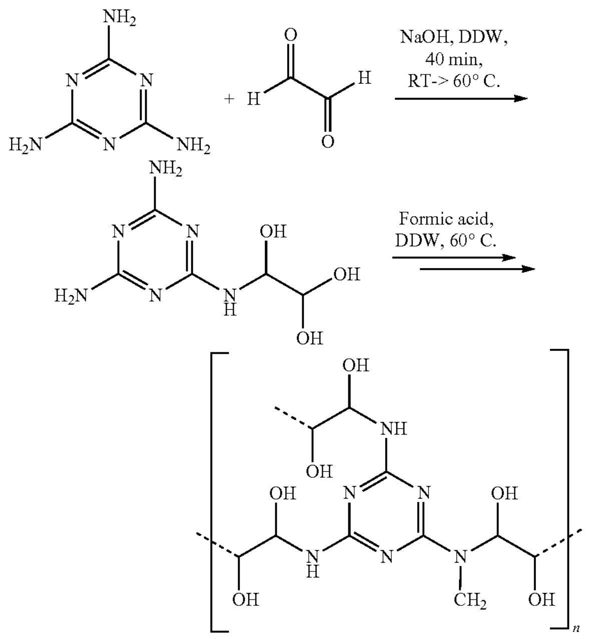

Polymer polyglyoxal melamine comprises at least two monomeric units having a structure represented herein by Formula (XVIII) and at times denoted as P10 or APC-0010.

Then, the solid was filtered using Buchner funnel, and dried by a desiccator with silica-gel or oven (50° C.) for at least 12 h to obtain a 728.0 gr. bright yellow powder. FT-IR ν ($cm^{-1}$): FT-IR ν ($cm^{-1}$): 3335, 3225 (N—H stretch); 3660-3000 (br, O—H stretch); 1580,1400 (1,3,5 s-triazine stretch); 1160 (C—OH stretch); 820 (1,3,5 s-triazine out of plane ring bend).

Example 3. Synthesis of Poly Melamine Urea Formaldehyde

As depicted in scheme3 275.6 gr melamine and 24.0 gr Urea were added with 377.1 gr total weight of formaldehyde solution (37%) to 2 liter 3 necks round-bottom flask reaction vessel connected to stirrer motor, pH meter and thermometer. after a good stirring was achieved, the solution was basified to pH=8.8-9.0 using 48% NaOH solution (aq.) and the reaction temperature was increased to 80° C., during 55-65 minutes. after 80° C. was reached, the reaction was proceeded in 80° C. with monitoring end point every 10 minutes. After the E.P. was reached, the solution was basified again to pH=8.8-9.0 using 48% NaOH solution (aq.) and the reaction was allowed to cool down to ambient temperature. When the reaction temperature dropped to 65° C. more 60.9 gr Urea was added and reaction temperature continue to cool down to ambient temperature. Then, the product was filtered using a Buchner bicker under vacuum (6 mbar) and dried by a desiccator with silica-gel or oven (50° C.) for at least 12 h to obtain a 275.0 gr. white powder. FTIR-spectrum with peaks on ν ($cm^{-1}$)=3460, 3330, 3200 (broad) ($NH_2$ stretching), 2950 (O—$CH_3$, aliphatic ether), 1650 (C═O, stretching of primary amide), 1520, 1450 (1,3,5 triazine stretching), 1380 (C—H mode of $CH_2$ and $CH_3$), 1360 (C—N stretching of $CH_2$—N), 1250 (C—N stretching of amide) 1180 (C═N stretching), 1080 (C—O stretching of ether), 980 (CH), 810 ($(CNH)_3$ triazine). $^1$H-NMR (500 MHz, DMSO-$d_6$): 7.7-7.2 (m, 2H, M-NH—$CH_2$), 6.6-6.2 (m, 2H, M-NH—C(═O)), 5.5-5.2 (m, 2H, M-$CH_2$—OH), 5.1-4.6 (m, 2H, methylene glycol+M-$CH_2$-R+M-$CH_2$—OR), 4.5 (dt, 1H, OH (Diethylene glycol), 3.5 (s, 2H, $CH_2$—$CH_3$ diethylene glycol) ppm Scheme 3: Chemical synthesis of polymelamine urea formaldehyde

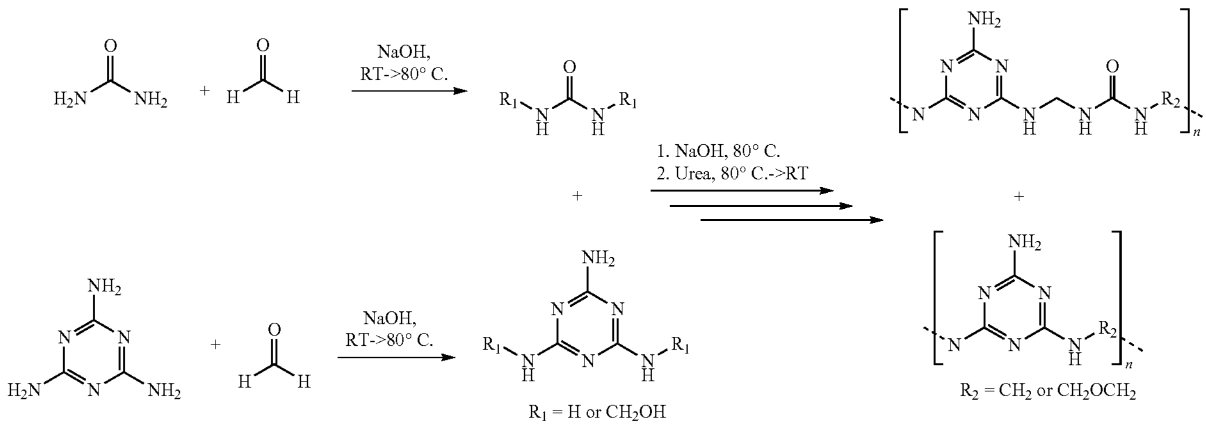

Poly melamine urea formaldehyde polymer comprises at least two monomeric units having a structure represented herein by Formula (XX), (XXI) and (XXII) and at times denoted as P8 or APC-0008.

Example 4. Preparation of APC-Containing Liquid Formulations a

Below are exemplary formulations which were prepared using the polymers of the present disclosure.

Polymers synthesized as described in Examples 1-3, were obtained as a powder having about 70-90 μm particle size and were used for the preparation of various resin-based formulations. Tables 2A-2I provide details on the components.

TABLE 2A

| Components of Formulation 1A (also denoted as Liquid APC-0004) | | |
|---|---|---|
| Ingredient | Description | % (w/w) |
| WorleecrylA2126 | styrene modified acrylic resin (60% w/w solids) | 62.5 |
| APC-0004/P4 | polymer | 1.7 |
| xylene | solvent | 8.9 |
| DisperBYK161 | dispersant | 0.7 |
| BYK3550 | Wetting agent | 0.1 |
| BYK411 | rheology agent | 0.1 |
| xylene, butyl acetate | diluent | 26 |

This formulation is suitable for at least coating of metal surface, wood surface, plastic surface.

TABLE 2B

| Components of Formulation 1B (also denoted as Universal APC-0004 or Universal APC-0009) | | |
|---|---|---|
| Ingredient | Description | % (w/w) |
| Snir2000 | Topcoat, 2K mixture of acrylic and polyurethane resins (65-70% solids) | 92 |
| APC-0004/P4 or APC-0009/P9 | polymer | 2 |
| xylene, butyl acetate | diluent | 6 |

It should be noted that this formulation is compatible with all APCs and provides two as exemplary formulations.

This formulation is suitable for at least coating of metal surface, plastic surfaces, cars surfaces, airplanes surfaces, furniture surfaces.

TABLE 2C

| Components of Formulation 1C (also denoted as Solid APC-0004-SL-Flooring) | | |
|---|---|---|
| Ingredient | Description | % (w/w) |
| SL-flooring | (100% solids) topcoat for flooring, self-leveling polyurethane paint | 98 |
| APC-0004/P4 | polymer | 2 |

This formulation is suitable for at least coating of concrete surface, wood surface and metallic surface such as metallic floor.

TABLE 2D

| Components of Formulation 1D (also denoted as Aqueous APC-0004-I2) | | |
|---|---|---|
| Ingredient | Description | % (w/w) |
| PS-270-12 (Isralak) | water-based (40-45% solids), metal paint (base and topcoat, 1K, alkyd polyurethane and anticorrosive pigments | 82.8 |
| APC-0004/P4 | polymer | 2 |
| water | dilutant | 14 |
| Disperbyk 2012 | dispersant | 1.0 |
| BYK349 | wetting agent | 0.2 |

This formulation is suitable for at least coating of metallic surfaces.

TABLE 2E

| Components of Formulation 1E (also denoted as Aqueous APC-0004-I4) | | |
|---|---|---|
| Ingredient | Description | % (w/w) |
| Paint#4 (Isralak) | water-based (35% solids), metal paint topcoat, 1K, based on acrylic resins and polyurethane polyester | 82.8 |
| APC-0004/P4 | polymer | 2 |
| water | dilutant | 14 |
| Disperbyk 2012 | dispersant | 1.0 |
| BYK349 | wetting agent | 0.2 |

This formulation is suitable for at least coating of metallic surfaces.

TABLE 2F

| Components of Formulation 1F (also denoted as Alfacryl-0009) | | |
|---|---|---|
| Ingredient | Description | % (w/w) |
| Alfacryl 26 XB 65 (Alfa Kimya, Turkey) | resin (65% solids in xylene and butyl acetate) acrylic polyol and thermoplastic acrylic resin | 62.5 |
| APC-0009/P9 | polymer | 1.7 |
| xylene | solvent | 8.9 |
| Disperbyk 2012 | dispersant | 0.7 |
| BYK3550 | wetting agent | 0.1 |
| BYK411 | rheology agent | 0.1 |
| xylene, butyl acetate | diluent | 26 |

This formulation is suitable for at least coating of metallic surfaces, wood surfaces and plastic surfaces.

TABLE 2G

| Components of Formulation 1G (also denoted as Aqua-Glass APC-0009) | | |
|---|---|---|
| Ingredient | Description | % (w/w) |
| Aqua-Glass (Epolac, Israel) | resin (45 ± 2% solids in water) 2K polyurethane water-based topcoat | 87 |
| APC-0009/P9 | polymer | 2 |
| water | solvent | 14 |
| Disperbyk 2012 | dispersant | 1.0 |
| BYK349 | wetting agent | 0.2 |

This formulation is suitable for at least coating of metallic surfaces corrosive surfaces, as a topcoat of polyurethane coating

TABLE 2H

| Components of Formulation 1H (also denoted as White APC-0009) | | |
|---|---|---|
| Ingredient | Description | % (w/w) |
| White (Israelac, Israel) | resin (55-65% solids in water, depending on color) 1K water-based acrylic paint | 87 |
| APC-0009/P9 | polymer | 2 |
| water | solvent | 14 |
| Disperbyk 2012 | dispersant | 1.0 |
| BYK349 | wetting agent | 0.2 |

This formulation is suitable for at least coating interior and exterior walls

TABLE 2I

| Components of Formulation 1I (also denoted as White APC-0010) | | |
|---|---|---|
| Ingredient | Description | % (w/w) |
| White (Isralac, Israel) | resin (55-65% solids in water, depending on color) 1K water-based acrylic paint | 87 |
| APC-0010/P10 | polymer | 2 |
| water | solvent | 14 |
| Disperbyk 2012 | dispersant | 1.0 |
| BYK349 | wetting agent | 0.2 |

This formulation is suitable for at least coating interior and exterior walls.

Example 5—the Effect of APC-Containing Formulations on Coated Stainless-Steel Surfaces: Solvent-Based Formulations For the purpose of coating surfaces with the liquid formulations, the formulation obtained was sprayed or brushed on stainless-steel (316L) coupons for mechanical, chemical, and antimicrobial or anti-viral characterization. Prior to that, if needed, the surface of the coupons was coated with a primer formulation (as example, Liquid primer) as detailed in Table 3. The thickness of the primer coating (Liquid primer) was up to 10 μm, e.g., 4-8 μm. The overall thickness of the coating (primer and topcoat) obtained was 25-120 μm, depending on the formulation; its adhesion to the stainless steel was 0 (based on ISO [International Organization for Standardization] 2407 classification; the edges of the cuts were completely smooth; none of the squares of the lattice was detached), and its hardness was 2H-3H (measured by pencil test, ISO 1518).

TABLE 3

| The composition of Liquid primer | | |
|---|---|---|
| Name | Description | % (w/w) of Liquid primer formulation |
| Worleeacryl A2126 | resin | 58.8 |
| xylene | solvent | 41 |
| DisperBYK-161 | dispersant | 0 |
| BYK3550 | wetting agent | 0.1 |
| BYK411 | rheology agent | 0.1 |
| xylene, butyl acetate | diluent | 0 |

The formulation (topcoat obtained was brushed, sprayed, or hand bar coated (using K Hand coater, bar no. 5 blue) on stainless-steel (316L) with or without primer coupons for mechanical, chemical, and antimicrobial characterization. When sprayed, the formulation was first diluted with 10-15% w/w extra solvent (xylene or butyl acetate). As a control, the surface of stainless-steel coupons was coated (by spraying, brushing, or hand bar coating) with a primer (Liquid primer) formulation consisting of the components listed in Table 3 or with the paint formulation (e.g. Snir2000) without APC added, as it supplied form the producer. The overall thickness of the Universal APC-0009 coating (primer and topcoat) obtained was 25-60 μm; its adhesion to stainless steel was 0 (based on ISO 2407 classification; the edges of the cuts are completely smooth; none of the squares of the lattice was detached), and its hardness was 2H-3H (measured by pencil test, ISO 1518).

Solvent-Borne Coatings Adjusted for Walls and Floors

For coating of walls, Cerafluor 970 (BYK-Chemie, Germany; micronized polypropylene-based wax for solvent-borne coating systems and powder coatings to improve anti-slip properties and for matting) at 0.1% w/w was added to the as-prepared Liquid APC-0004 (Formulation 1A) or Universal APC-0004 formulation (Formulation 1B), so as to impart easy-to-clean features to the coated surface, in order to obtain self-cleaning and anti-microbial coating.

For coating of floors, non-slip additives such as CERETAN® 780/M (polyethylene-wax) (Munzing, Germany), at 0.5-2% w/w to solids, were added to the as-prepared Liquid APC-0004 formulation before use. Alternatively, excess of Resustat Terrazzo Aggregate (quartz aggregates; The Sherwin-Williams Company, United Kingdom) may be spread on a freshly coated, non-cured primer layer, prior to the application of the topcoat.

Preparation of Waterborne Resins-Based Formulations

APC-0008/0009/0010-Slurry addition to water-born paint: first, the concentrated slurry of APC-0008/0009/0010 was prepared by vigorous milling of APC powder in water in ration 1:1 w/w, the mixing is performed with mechanical stirring with silica beads (ball-milling), diameter 1.4 mm, MRC, Israel. The powder was milled for 1 h till "milk" composition obtained-no particles, homogeneous slurry. This slurry is ready to use for various water-based pants, as a concentrate. The dispersants, wetting agents and other ingredients can be added to improve the final paint formulation.

Direct addition of powder APC-0008/0009/0010 to the water-based paint: Aqua-Glass APC-0008, as an example, was prepared by mixing the resin raw material Aqua-Glass (Epolac, Israel) part A in the presence of silica beads, 1.4 mm (MRC, Israel). The silica beads were added for better milling and homogeneity of the final powder in the paint. The formulation obtained was applied on stainless-steel coupons (5×5 cm). The thickness of the coating obtained was 20-30 μm; its adhesion to the stainless steel was 4 (based on ISO 2407 classification; the coating had flaked along the edges of the cuts in large ribbons and/or some squares had partly or wholly detached. A cross-cut area greater than 35%, but not greater than 65%, was affected), and its hardness was 2H (measured by pencil test, ISO 1518).

Mechanical and Chemical Characterization of the Obtained Coatings

Mechanical properties. Mechanical tests were performed on each coating. Adhesion was measured according to ISO edition 2409, using Elcometer® 107 cross hatch adhesion tester. Typically, the results showed adhesion at classification from 0-5, where 0 indicates the highest adhesion quality (the edges of the cuts are complete); and 4-5 indicates the lowest adhesion quality (the coating has flaked along the edges of the cuts in large ribbons and/or some squares have partly or wholly detached). A cross-cut area greater than 35%, but not greater than 65%, is affected.

Hardness was measured according to ISO edition 15184, using the pencil hardness test also referred to as the Wolff-Wilborn test, which determines film hardness by pushing a graphite pencil with known hardness over the coated film. A spectrum of pencils is available, labeled according to their graphite hardness from 8B-9H, wherein 8B is the softest pencil and 9H is normally the hardest in the set. Important to note, no change in adhesion or hardness was obtained as a result of APC additions with none of the tested paints.

Chemical properties. It was assumed that the polymer (at times denoted herein as APC) particles in the upper surface of the coating, upon exposure of the coating to a biocide-containing charging solution, act as small "containers" that adsorb the biocide. In order to test this hypothesis, APC-containing coatings were exposed to a biocide ($ClO^-$)-containing charging solution, and the concentration and distribution of the biocide within the coating layer was measured, using Environmental Scanning Electron Microscopy with Energy Dispersive X-ray analysis (E-SEM EDX).

Figure 2A:
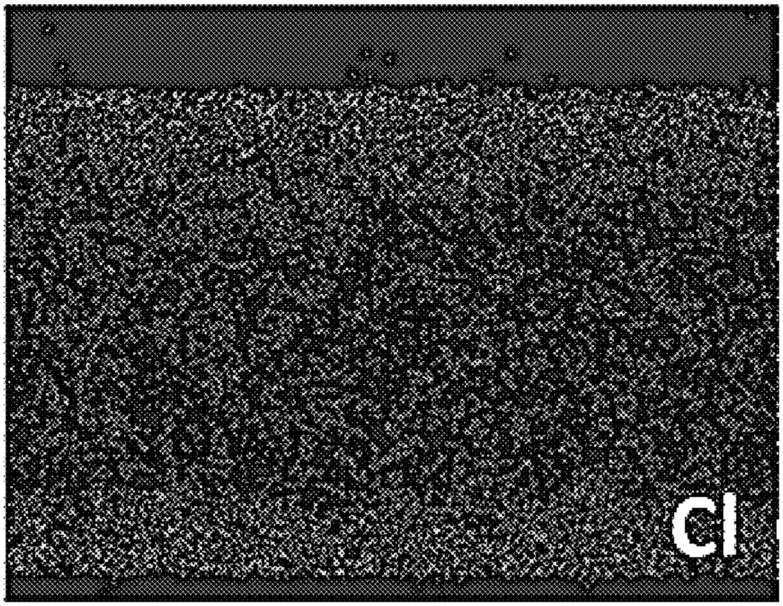
FIGS. 2A and 2B are Energy-dispersive X-ray spectroscopy (EDX) images results of cross-sectional analysis with Scanning Electron Microscopy (SEM) of atomic chloride on a FIG. 2A—surface coated with a control and FIG. 2B—surface coated with a product comprising the polymer.
Figure 2B:
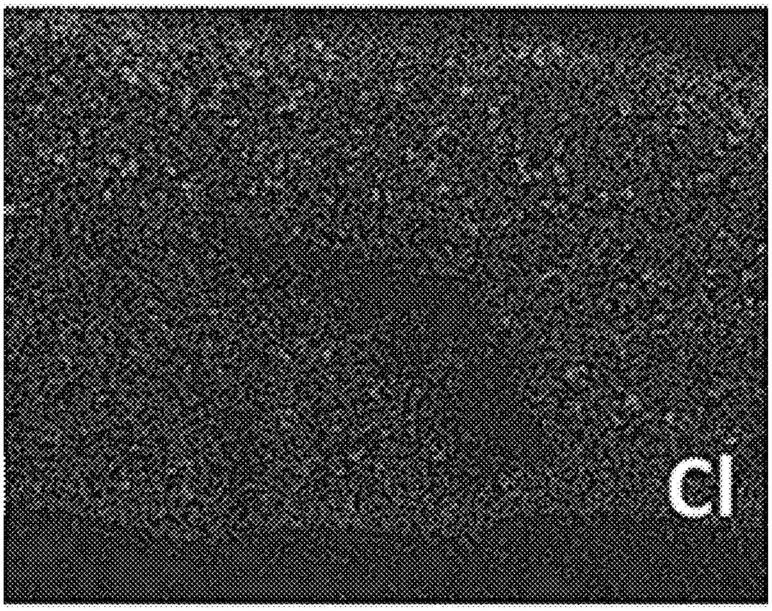

FIGS. 2A and 2B shows representative EDX results of cross-sectional analysis with SEM of the biocide extracted into a coating obtained with the Formulation 1A (FIG. 2B) and into a coating obtained with the corresponding primer (Liquid primer, FIG. 2A) formulation (no active material; left panel; control), following treatment with a charging solution of sodium hypochlorite 3-6% having a pH of 5.5, adjusted with glacial acetic acid.

These studies demonstrated that while chlorine was present in the coating that included the polymer of APC-0004, no traces of chlorine was found within the Liquid primer formulation-based coating. Additionally, no chlorine odor from the coatings was detected.

In order to measure the ability of the polymer-based coating to hold a biocide, specifically chlorine, the degree of chlorine evaporation was tested in a "closed box" experiment.

An exemplary setup including a box having walls (side walls 50×80 cm, edge walls 50×50 cm), made of Polygal polycarbonate, which were either top-coated with the Liquid APC-0004 formulation (activated walls), or not coated at all (control walls). Both walls (activated and control) were treated with a charging solution containing 1% $ClO^-$ (obtained with Activator-1). Then, a $Cl_2$-measurement counter was placed inside the box, and the box was closed with tap for continuous monitoring.

Figure 3:
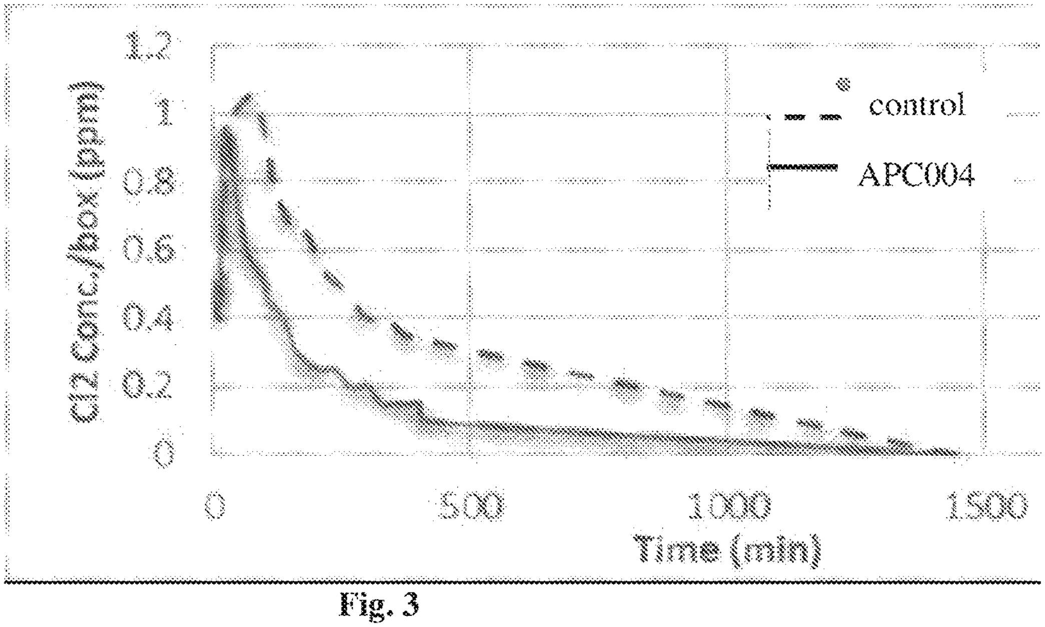
FIG. 3 is a graph showing results of a "closed-box" experiment measuring the concentration of evaporated with time $Cl_2$ or $OCl^-$ from the walls of uncoated box and box coated with APC-004, after treatment with biocide solution. The box closed with tap, but not isolated. #

FIG. 3 shows results from a "closed box" experiment performed in order to measure the concentration in the air of the $Cl_2$ evaporated from a surface coated with an APC-containing formulation, after application of a chlorine solution, as compared to an uncoated control surface.

As shown in FIG. 3, less $Cl_2$ was evaporated from the wet surface of the activated walls (after treating with the charging solution) as compared to the uncoated control walls, indicating adsorption of at least part of the biocide by the APC particles. As shown, no $Cl_2$ was released from the dry coating, i.e.—zero $Cl_2$ obtained after sufficient time. As the inside of the box is a closed (non-isolating) system having a small volume-to-walls-area ratio, the presence of $Cl_2$ in the air remained for a long period of time.

Example 6. Development of Biocide Solutions

Additional biocide solutions were optimized as follows:

Type 1. Sodium hypochlorite-based formulations in either a solution or gel form, with addition of acetic acid to reach a pH of 5.5 prior to application, were prepared at hypochlorite concentrations of 5, 3, 0.5, and 0.1% (w/w), with 2.5% (w/w) Tween 20 (Sigma-Aldrich, Israel) as a surfactant to lower the surface tension on hydrophobic coatings. While high antimicrobial activity (tested according to ISO 22196) was shown for the 5% and 3% solutions and gels, no antimicrobial activity was obtained with the 0.1% and 0.5% solutions and gels.

Type 2. Sodium hypochlorite-based formulations in either a solution or gel form, without acidification by acetic acid, were prepared at hypochlorite concentrations of 5, 3, 0.5 and 0.1% (w/w), with 2.5% (w/w) Tween 20 as a surfactant to lower the surface tension on hydrophobic coatings. These formulations showed low or no antimicrobial activity (tested according to ISO 22196)

Type 3. Sodium dichloroisocyanurate (Sigma Aldrich, Israel)-based formulations in either solution or gel form were prepared at concentrations of 15, 9, 6, 1.5, and 0.3% sodium dichloroisocyanurate (w/w), with 2.5% (w/w) Tween 20 as a surfactant to lower the surface tension on hydrophobic coatings. A medium antimicrobial activity (tested according to ISO 22196) was obtained with the 1.5% solution and the best antimicrobial activity was obtained with the 6% solution; however, the solubility of said solution was low.

Type 4. Dichloroisocyanurate-based formulations in the form of a solution were prepared at various concentrations, by dissolving one or more dichloroisocyanurate sanitizing tablets (Endbac, Diversy Inc., USA) in distilled water (one tablet dissolved in 30 mL gives 4.5% w/w of the tablet's content in solution), and a surfactant such as Tween 20 (8 drops of 25% w/w in water) was added to lower the surface tension on hydrophobic coatings. The best antimicrobial activity was obtained with the 1-2% solutions.

Type 5. Sanitizing powder of dichloroisocyanurate (54-56% w/w of atomic chlorine, ChloRun®) was obtained from ICL Corporate (Israel). The powder form enhances the stability of the dichloroisocyanurate as well as its dissolution in water, safety and charging ability, combined with highest w/w concentration of chlorine atoms. Tween 20 (2.5% w/w) was added for better wetting contact between the solution and the surface. As found, the ChloRun®-based solution was much more attractive as a charging solution, demonstrating higher activity of the charged coatings with a lower atomic % of chlorine (full activity was obtained even with 1% w/w of ChloRun®, which is equivalent to only <0.5% w/w of active chlorine) as compared to the other hypochlorite-based solutions.

This product was highly active even at a concentration of 1% w/w of ChloRun® in water (equivalent to 0.5 atomic w/w % of chlorine) and soluble up to a concentration of 5% w/w of tablet content in water (equivalent to 2.75 atomic w/w|% of chlorine), and was found to be the best charging solution (referred to herein as "Activator-1"). Moreover, whereas hypochlorite solutions are typically obtained at a basic pH, and without acidifying (which is not safe and generally forbidden in the industry), very low concentrations of $ClO^-$ are extracted and adsorbed into the coatings, dichloroisocyanurate such as ChloRun® forms solutions at a moderate pH without any acidic additives, and much more $ClO^-$ is thus adsorbed into the coatings.

The optimized charging conditions with Activator 1: The ChloRun® powder is dissolved in water not longer than 10 h before application on coatings, in 1.5% w/w of $OCl^-$, the charged surfaces are wetted with sufficient amount of Activator-1 solution for full coverage. The solution is allowed to dry. For antimicrobial lab test-all the surfaces are dried for at least 24 h and washed thoroughly under water prior antimicrobial assay. This drying time and washing are necessary to completely remove all the untouched chlorine traces that might influence the results and give false positive response. This method was validated through numerous experiments and was demonstrated as reliable and less dependent on experiment charging conditions, such as temperature, humidity etc.

Example 7: Microbiological Activity of the Polymers on *E. coli* ATCC 8736 Growth All coatings developed in the lab, made of various polymer formulations were tested, after application with different biocide solutions, for their antimicrobial activity. The experiments were performed according to ISO edition 22196:2019 with different microorganisms.

Figure 4:
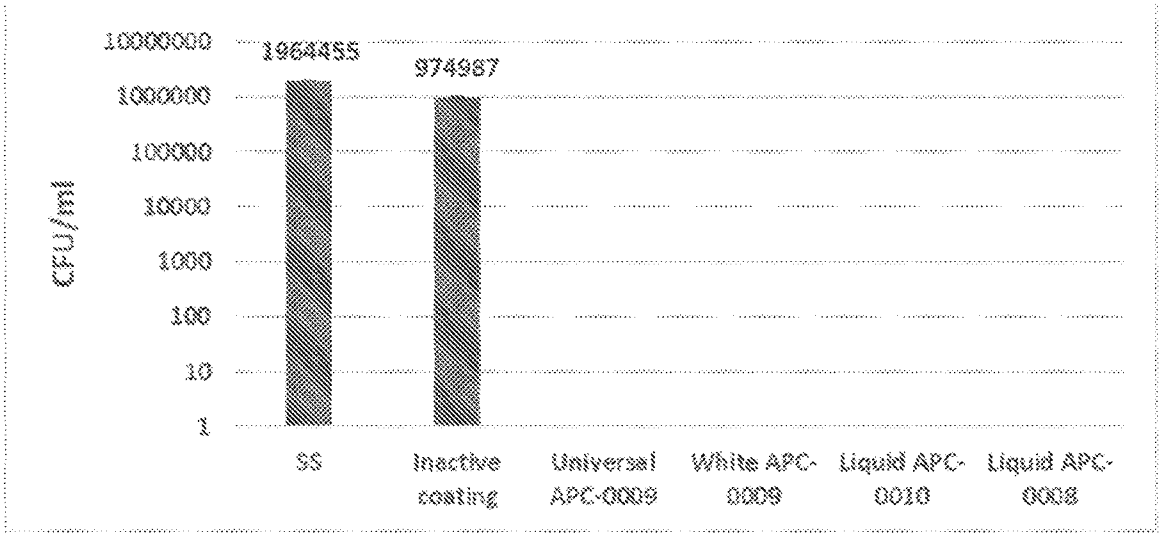
FIG. 4 is a bar graph showing the survival (in a logarithmic scale) of *E. coli* ATCC 8736 on stainless-steel (SS) coupons coated with exemplary formulations or with a formulation without a melamine-based polymer of the disclosure (APC) ("inactive coating") or without coating (SS) as controls.

FIG. 4 shows results of survival assay of *E. coli* ATCC 8736 on stainless-steel coupons (5×5 cm) coated with, Universal APC-0009 formulation, White APC-0009, or Liquid APC-0010 and Liquid APC-0008 formulations, after application of 2% w/w of Activator 1 in TDW or with a coated surface only as controls. The microbial tests were performed in the Milouda-Migal Laboratories, for 24 h at 35° C., according to ISO 22196 with log 6 CFU of inoculum.

Results:

FIG. 4 shows results of the microbial tests, indicating that while the three APC-containing coatings had no bacteria growth on the coated coupons.

Identical results were obtained for polymers containing coatings with different bacteria: *E. coli* ATCC 25923, *S. aureos* ATCC 6538, and *Pseudumonas* ATCC 700888 at different experimental conditions: log 5-log 7 CFU, temperatures: 35° C., 37° C., or room temperature, time of exposure 6, 8, 16, 24 h (results not shown).

Figure 5A:
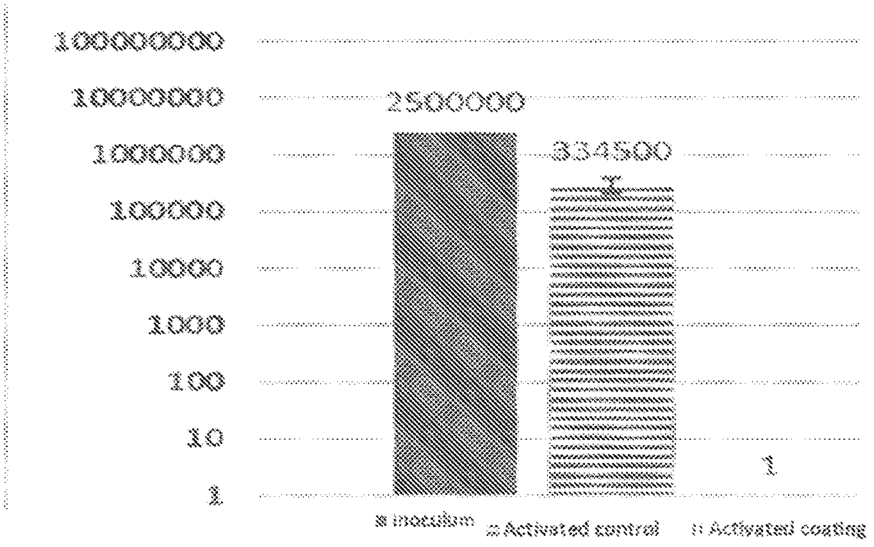
FIGS. 5A to 5D are bar graphs showing the survival (in a logarithmic scale) of pathogenic microorganisms on stainless steel (SS) coupons coated exemplary formulation.
Figure 5B:
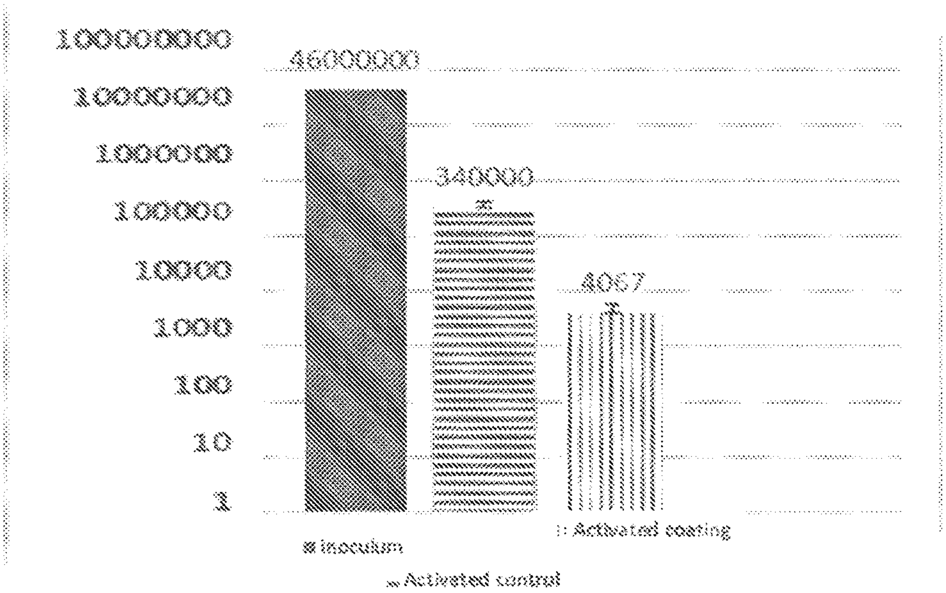
Figure 5C:
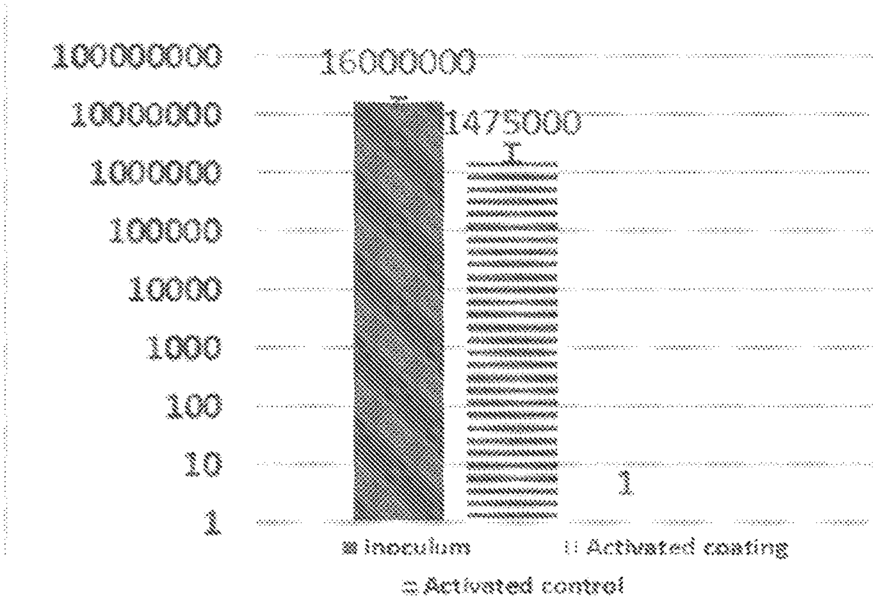
Figure 5D:
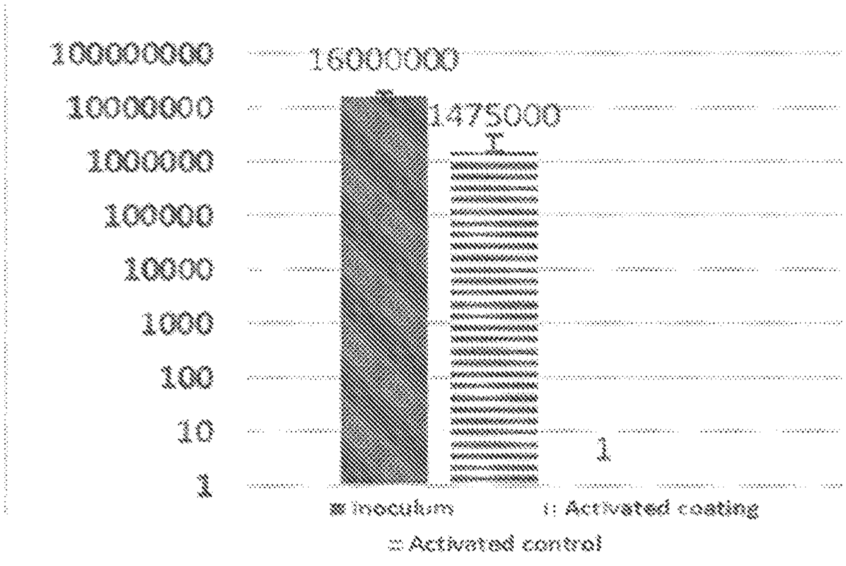
Figure 6A:
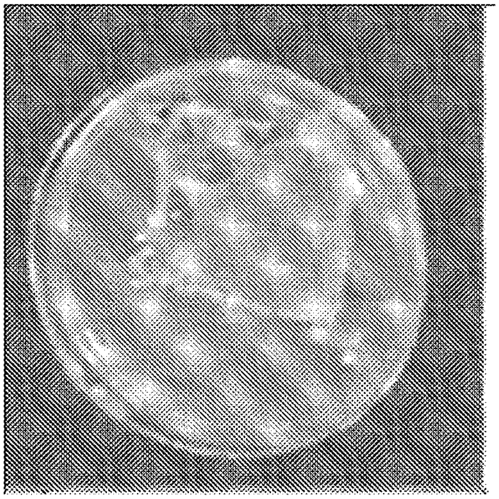
FIG. 6A-6D are images of petri dishes showing full (FIG. 6A), moderate (FIG. 6B), low (FIG. 6C), and no (FIG. 6D) anti-bacterial activity examples for defining the scale-bar of surface-touch method activity evaluation of surfaces coated with polymers.
Figure 6B:
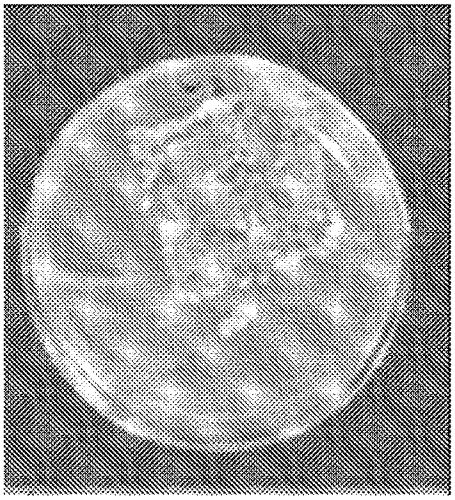
Figure 6C:
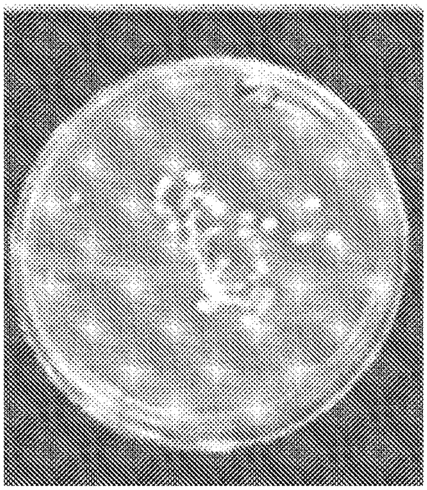
Figure 6D:
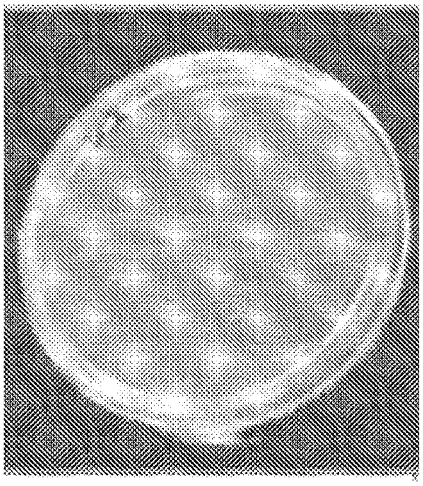

Example 8. Microbiological Activity of the Polymers on Pathogenic Microorganisms FIGS. 5A-5D shows the survival of pathogenic microorganisms, FIG. 5A-*Aspergillus niger*, FIG. 5B *Saccharomyces cerevisiaea*; FIG. 5C-*Listeria Monocytogenes* and FIG. 5D *Salmonella enterica abaetetuba* on stainless-steel coupons (5×5 cm) coated with the Formula 1A. The test was performed according to ISO 22196, and the coupons were exposed to the pathogen for 24 h at 35° C. As shown, the coating with Formula 1B, after charging, was able to significantly reduce the population of bacteria (*Listeria Monocytogenes* and *Salmonella Enterica* Abaetetuba), yeast (*Saccharomyces Cerevisiaea*), and molds (*Aspergillus niger*) on the coated surfaces. Interestingly, the coating was able to reduce by 99% the population of *Aspergillus niger*, which is sporous and known to be highly stable. Activator 1 was used as the biocide, the formulation is Aqua-Glass APC-0009.

Example 9. Effect on Multiple Bacterial Loading

Table 4 shows the antibacterial activity of stainless-steel coupons (5×5 cm) coated with the Formula 1H or the corresponding primer (White, Isralak) formulation (no active material), after charging with 0 and 1% $ClO^-$.

The test was conducted according to ISO 22196, using a "surface print" method during a series of successive tests carried out with the same coated and charged surface without recharging in between, by contacting an agar plate with the coated and charged surface several times, each following an exposure (24 h, at room temperature) to the bacteria.

TABLE 4

Effect of the polymer on multiple bacterial loading

| Formulation | $ClO^-$ in charging solution | $1^{st}$ cycle | $2^{nd}$ cycle | $3^{rd}$ cycle | $4^{th}$ cycle | $5^{th}$ cycle | $6^{th}$ cycle | $7^{th}$ cycle | $8^{th}$ cycle | Recharge $ClO^-$ in charging solution | $1^{st}$ cycle | $2^{nd}$ cycle |
|---|---|---|---|---|---|---|---|---|---|---|---|---|
| Formula 1H | 1% | +++ | +++ | +++ | +++ | +++ | +++ | ++ | + | 1% | +++ | +++y |
| | 0% | NA | NA | NA | NA | NA | NA | NA | NA | 0% | NA | NA |
| White-primer- | 1% | ++ | NA | NA | NA | NA | NA | NA | NA | 1% | +++ | NA |

+++ full activity,
++ moderate activity,
+ low activity,
NA—no activity,
(see FIG. 6 for a bar scale)

As can be seen from Table 4, coatings based on the formulation 1H were highly active after application of a biocide solution, even after 6 cycles of bacterial loading (log 6 CFU), and moderately active in the 7th cycle.

Application with the biocide solution after the 7th cycle reactivated the coating once again, and high activity was shown after at least two more successive cycles of bacterial loading.

On the other hand, coatings based on the primer formulation (control coatings, without polymer) were somewhat active only for one cycle but were not active at all after several cycles of bacterial loading. In addition, coating based on primer formulation were reactivated upon recharging probably due to porosity, water permeability through pigments or to amine-containing groups presented in resin structure. The results shown were obtained with *E. coli* bacteria.

These results show that application of a biocide solution such as $OCl^-$ has different antibacterial effect depending on the surface (the coating) on which it is applied. While application of the biocide solution on a polymer-based coating was active after 6 cycles of bacteria loading in contrast with non-polymer based coating which was somewhat active only in the first bacteria loading.

These results suggested that the $OCl^-$ anion, which interacts with the polymer via electrostatic interactions, is present both on the surface of the polymer and within (embedded) the polymeric matrix and hence is capable of negatively affecting bacteria growth both immediately (due to $OCl^-$ anions on the polymer surface) and also during time after multiple bacteria loadings, due to diffusion of the $OCl^-$ anions from the coating matrix to the coating surface. In contrast, application of $OCl^-$ on primer formulation without a polymer is active only immediately after application and not during repeated bacteria loading.

FIGS. 6A-6D show Petri dishes indicating full, moderate, low, and no activity of the coatings used in antimicrobial test. As an representative example for qualitied evaluation of bacterial growth, the *E. coli* bacteria was grown in different concentrations and drop casted on stainless steel 316L coupons. These coupons touched the agar plate and the plates incubated for ON. These images of the resultant bacteria grown on the plates were used as a qualitied scale bar for comparison between different coatings.

Example 10. Effect on Viral Activity

In order to test the anti-viral activity of polymer-containing formulation-based coatings, after application, stainless-steel coupons coated with the Aqueous APC-0009 formulation, Universal APC-0001 formulation, or Universal APC-0009 formulation were used. The coatings were charged with a biocide solution 1% $OCl^-$ (from an Activator solution, type 4; see above), and the surfaces were then contacted with Vero cells (African green monkey kidney cells) infected with herpes simplex virus type 1 (HSV-1). The stock concentration of HSV-1 was 108 plaque-forming units (PFU)/ml. 200 and 400 μl from each of three concentrations of the virus (log 7, log 6, and log 5) were placed on a surface as a drop or spread drop (for higher contact with the surface) and were then stored inside a Petri dish at room temperature for 24 h. Uncharged surface based on the Universal APC-0009 formulation was used as a control.

The tests were performed at the Department of Microbiology, Immunology and Genetics, Faculty of Health Science, Ben-Gurion University of Negev, Israel, according to ISO 21702:2019.

TABLE 5

Effect of polymers on viral growth (expressed as PFU/ml × $10^4$)

| Surface | Amount of plaques (PFU/ml × $10^4$) HSV-1 ($10^7$ PFU/ml) Drop (μl) 200 | 400 | Spread drop (μl) 200 | 400 |
|---|---|---|---|---|
| Control | 22 ± 1.5 | 48 ± 2.7 | 17 ± 1.8 | 44 ± 3.1 |
| Universal APC-0009 formulation | 0 | 0 | 0 | 0 |
| Aqueous APC-0009 formulation | 0 | 0 | 0 | 0 |

As can be seen in Table 5, no virus PFU were obtained on the charged coatings either with the universal or the aqueous; whereas, the virus concentration on the control surfaces was log 6 PFU.

Inverted light microscope analysis of the infected Vero cells after incubation on control surfaces and on surfaces coated with or Universal APC-0009 coatings demonstrated that Vero cells infected with the virus from the control surfaces were strongly damaged and infected by the virus that remained active; the cells infected with virus exposed to the charged surfaces were not damaged at all (the same as uninfected cells used as a reference), indicating that the virus was deactivated completely on the tested APC-containing coatings (data not shown) As the resin used in the coating formulation was more crosslinked (solvent-based coating formulation), the charging process was more challenging, i.e., smaller amount of $ClO^-$ was adsorbed in the Snir200-based coatings (i.e., Universal APC-0001/0004 formulation) and the antimicrobial activity of the coating lasted for a shorter term.

The amount of $ClO^-$ adsorbed in the coating after charging was estimated by the number of successive anti-microbial cycles achieved without recharging. The coating was found to be highly active when a reduction by log 6 of the bacteria count was shown. The solvent-based resins were able to maintain 1-2 active cycles, while the water-based resins maintained 4 active cycles (Table 5). Multiple applications of a recharging solution to the same coating did not affect the antimicrobial activity of the coating, indicating no leaching of the active material (APC) from the coating even after numerous experiments. The charged coatings were found to be both anti-bacterial and anti-viral.

Example 11: Antimicrobial Effect of Coating with Polymer of Formula Based on APC-0009

Materials and Methods

Tryptic soy agar (Sigma Aldrich, IsraeL), Saline (0.85% w/v NaCl, Gadot, Israel, in deionized water). Bacteria type used in test is maintained per experiment.

Bacteria growth, inoculum preparation and bacterial concentration adjustment are performed as described in ISO 22196. The 0.2-0.4 ml of ca. Log 6 cfu/ml inoculum is drop casted on the studied surface (5×5 cm). The surface is covered with sterile PET film (4×4 cm) and the incubation is performed. The incubation conditions may vary: contact time—from 5 min to 24 h, temperature: room temperature, 35° C., 37° C. depending on the experiment purpose.

Following the incubation, the evaluation of bacteria concentration on surfaces was evaluated by 2 methods:

1. qualitative evaluation—the surface touch method, where PET film and the surface touches agar plate, and incubated for ON; the activity of the surfaces described by: full-no bacteria found on agar plates, high-single colonies obtained on plate (less than 10), moderate-some small number of separated colonies obtained, less than 30; low-still countable colonies, no "grass" formed, no activity-grass bacteria growth. The results are compared to control surfaces (activated coatings, without APC) and positive control surfaces (stainless steel (316L)). See FIG. 6 for bar scale.
2. quantitative evaluation—the bacteria are removed from the surface by swabbing and 10-fold dilutions are performed, as described in ISO 22196.

Results:

Antimicrobial assay performed according to ISO 22196 were conducted at different times points on stainless steel (SS) without coating, SS coated with Worlycryl A2126 and SS coated with Liquid APC-0009.

Figure 7:
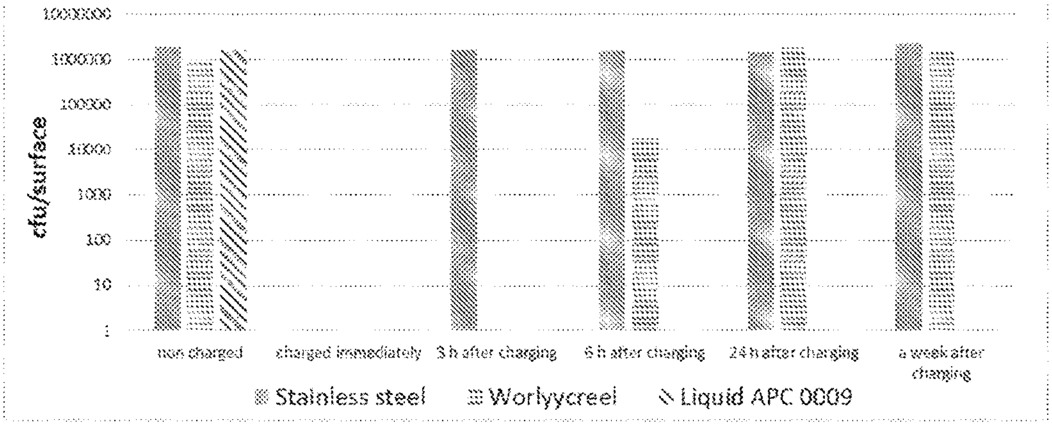
FIG. 7 is a bar graph showing the effect of coating of exemplary formulation in an antimicrobial assay on *E. coli* according to ISO22196 when applied as coating.

As shown in FIG. 7, all surfaces were found to have anti-microbial activity immediately following application of biocide thereon. However, only SS coated with either amine-containing Worleecryl A2126 and Liquid APC-0009 demonstrated anti-microbial activity 3 hours after application of the biocide. At 24 hours after application of the biocide, only Liquid APC-0009 was active, resulting in complete reduction of log 6 cfu *E. coli.*

These results show that coating of with APC-0009 stabilizes significantly larger amount of the biocide, $OCl^-$ with stronger interaction with the amine groups of the melamine-based polymer even when compared to other amine-containing coatings.

The results suggested that the biocide is embedded within the melamine based polymer and hence can be also active immediately and also at later time points, probably due to migration of the biocide into the polymer surface where it interacts with the microorganism and hence capable of reducing its amount, by killing the microorganism.

Example 12: Antimicrobial Activity of Different Coatings with Polymer X (APC-0009)

Materials and Methods

Tryptic soy agar (Sigma Aldrich, Israel), Saline (0.85% w/v NaCl, Gadot, Israel, in deionized water). Bacteria type used in test is maintained per experiment. Bacteria growth, inoculum preparation and bacterial concentration adjustment are performed as described in ISO 22196. The 0.2-0.4 ml of ca. Log 6 cfu/ml inoculum is drop casted on the studied surface (5×5 cm). The surface is covered with sterile PET film (4×4 cm) and the incubation is performed. The incubation conditions may vary: contact time—from 5 min to 24 h, temperature: room temperature, 35° C., 37° C. depending on the experiment purpose.

Following the incubation, the evaluation of bacteria concentration on surfaces was evaluated by 2 methods:

1. qualitative evaluation—the surface touch method, where PET film and the surface touches agar plate, and incubated for ON; the activity of the surfaces described by: full—no bacteria found on agar plates, high—single colonies obtained on plate (less than 10), moderate—some small number of separated colonies obtained, less than 30; low—still countable colonies, no "grass" formed, no activity-grass bacteria growth. The results are compared to control surfaces (activated coatings, without APC) and positive control surfaces (stainless steel (316L).
2. quantitative evaluation—the bacteria are removed from the surface by swabbing and 10-fold dilutions are performed, as described in ISO 22196.

The antimicrobial activity of different coatings with APC-0009 as a function of contact time was tested in SS coated with various resins: White-0009 is a 1H water-based paint (Isralak, Israel) contains high pigment concentration, Alfa-0009 is a solvent-based 2K PU less crosslinked transparent resin and Liquid APC-0009 is the densest transparent resin, 2K solvent based, acrylic polyurethane.

Figure 8:
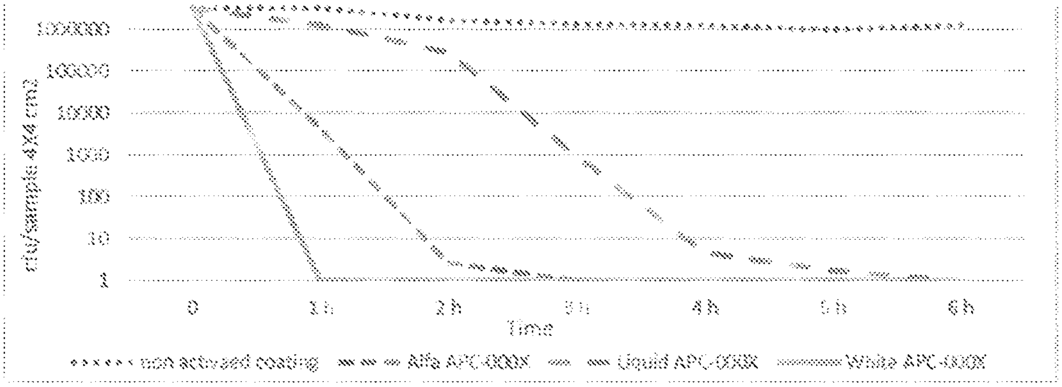
FIG. 8 is a graph showing antimicrobial effect of APC-0009 in various resins.

Results:

The results are shown in FIG. 8. As can be seen from FIG. 8, the antimicrobial effect in surface coated with White-0009 coating was triggered immediately after the contact with the biocide and resulted in elimination of the bacteria within one hour after contact. The effect observed with Alfa-0009 coating was somewhat delayed and elimination of the bacteria within two hours after contact. In contrast, the effect with Liquid APC-0009 coating started only after 2 hours after the contact and elimination of the bacteria within four hours after contact. Hence, in White APC-0009 which is the most permeable polymer tested, the contact time is much shorter (minutes), whereas in the less permeable polymers, the contact time is longer.

Further, the antimicrobial effect was determined after repeated loading of *E. coli.*

SS surfaces coated with White-APC-0009 or Universal APC-0009 were tested for their ability to reduce the *E. coli* count as a function of repeated *E. coli* loading after single application of biocide, $OCl^-$.

The coating were applied on stainless steel coupons 5×5 cm and the teste was performed according to ISO 22196, *E. coli*, using a "surface print" method during a series of successive tests carried out with the same coated and applied surface without application of the biocide in between, by contacting an agar plate with the coated and charged surface several times, each following an exposure (24 h, at room temperature) to the bacteria. The results are shown in Table 6.

TABLE 6

Anti-microbial successive sessions on charged with Activator 1 White and Universal coatings with and without APC-000X applied on stainless steel coupons 5 × 5 cm

| Formulation | $[ClO^-]$ charging solution | $1^{st}$ cycle | $2^{nd}$ cycle | $3^{rd}$ cycle | $4^{th}$ cycle | $5^{th}$ cycle | $6^{th}$ cycle | Recharge $[ClO^-]$ charging solution | $1^{st}$ cycle | $2^{nd}$ cycle |
|---|---|---|---|---|---|---|---|---|---|---|
| White APC-0009 * | 1% | +++ | +++ | +++ | +++ | +++ | Moderate activity | 1% | +++ | +++ |
| White | | +++ | NA | NA | NA | NA | NA | | +++ | NA |
| Universal APC-0009 ** | | +++ | NA | – | – | – | – | | +++ | NA |
| Universal | | NA | NA | – | – | – | – | | NA | NA |

* high PVC,
** low PVC (pigments volume concentration)
+++ full activity,
++ moderate activity,
+ low activity,
NA—no activity,
see FIG. 6 for bar scale As can be seen from Table 6, a strong antimicrobial effect was observed in surfaces coated with White APC-0009 and Universal APC-0009 and a moderate or full activity was observed in surface coated with white paint without APC as an additive, whereas no effect was observed in the surfaces coated with the control universal coating with no APC added.

Interestingly, when bacteria were loaded on the surface again (without biocide re-application), the full antibacterial activity was observed even after five successive cycles of bacteria loading only on the surface coated with While-APC-0009. As can be seen from Table 6, surfaces coated with Universal APC-0009 formulation were fully active for one cycle of bacterial loading (log 6 CFU) only.

Based on these results, it was suggested that application of a biocide on permeable-coatings such as White APC-0009 formulation allow a prolonged effect even when bacteria are applied repeatedly several times, without re-application of the biocide solution between.

This suggests that hypochlorite embedded within the coating (polymeric) matrix (including deeper layers in permeable layers) is mobile and available for migration into the polymer surface for antibacterial activity.

It should be noted that the percentage w/w of APC was the same in all tested resins, thus the amount of APC on the surface, that becomes in direct contact with the coating surface is more or less the same in all three paints and the coatings are homogeneous.

However, the permeability of the White paint provides easier migration of hypochlorite ions through the layer and enables deeper charging of the coating, due to high pigments content, i.e. high PVC (pigments volume concentration). This means that the APC, that is not in a direct contact with the surface, is charged as well. Thus, hypochlorite ions are stabilized in the deeper layers of the coating. Moreover, this hypochlorite is still mobile and available for antimicrobial activity, thus the number of cycles without reactivation is much higher.

Interestingly, these results suggested a unique interaction pattern between the amine groups of the polymer and OCl— which comprise an electrostatic interaction between the positively charged amines and the negatively charged biocides. It should be noted that if bacteria were killed by contact with N-Halamine (i.e. N—Cl bond) a similar activity would be observed for all resins, because the surface concentration of atomic chlorine is similar (depends on concentration of APC only), i.e. equal concentration of biocide is presented on the coating surface. However, the fact that different activity was observed with different resins suggested that chlorine is not bound only to the surface of the polymer as in covalent binding but rather is also embedded in deeper layers of the melamine polymer which is not in direct contact with the bacteria, and remains available to deactivate bacteria at prolong time points and even after numerous repeated application of bacteria.

Hence, the activity of melamine-based polymers that bind biocide electrostatically can be manipulated upon need by features of the coating. For example, a permeable coating resin would enable shorter contact time and numerous anti-microbial cycles without repeated application of the biocides, as compared to less permeable coating. In case of preamble resins, the effect is suggested to be due to hypochlorite ion ($OCl^-$) which diffused from inner polymeric layer.

Example 13: Determining Hydrogen Peroxide Activity with Polymer P9 (APC-0009)

Microbiological tests were performed on stainless steel (316L) surfaces coated with Formulation 1H (White APC-0009) and Formulation 1G (Aqua-Glass APC-0009) on which $H_2O_2$ was applied prior to contact with bacteria.

The results showed complete reduction of $\sim 1\times 10^6$ CFU/mL (*E. coli*) following the activation with Activator 0002 accelerated hydrogen peroxide ($H_2O_2<5\%$, Oxivir Plus Spray, Diversy, USA) with two successive anti-microbial tests, without re-activation between, even if activated 3 weeks prior testing.

Figure 9A:
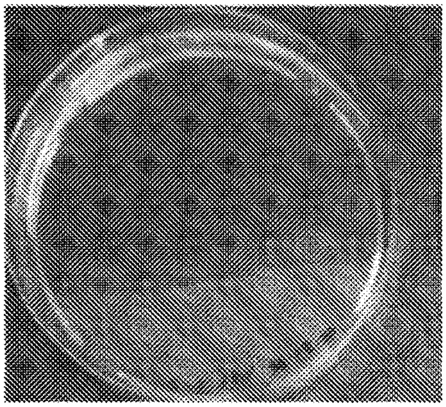
FIGS. 9A-9D are images showing the antimicrobial activity of different coatings with APC 0009 (and without APC-0009-control) as an additive, activated with Hydrogen peroxide; the test performed according to ISO 22196 and evaluated by surface-touch method. Complete reduction was obtained with APC additive.
Figure 9B:
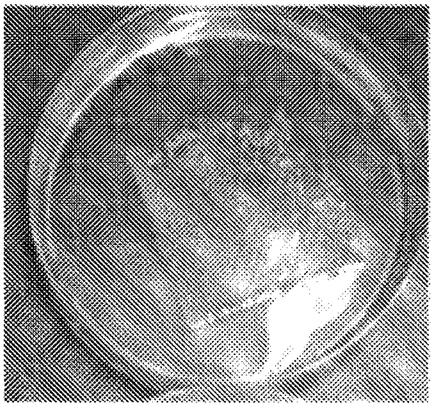

FIGS. 9A-9B show anti-microbial test results (based on ISO 22196), for the second bacteria loading without repeated application of with hydrogen peroxide of Formulation 1H (FIG. 9A) and control (FIG. 9B). As can be seen, the coatings with polymer P9 gave complete reduction of bacteria.

Figure 9C:
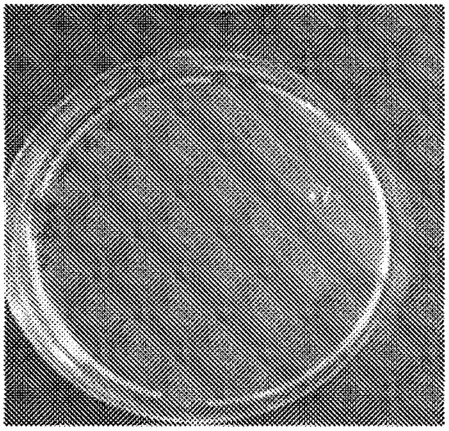
Figure 9D:
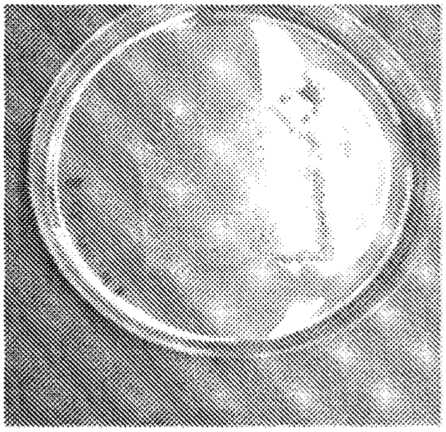

FIG. 9C-9D show anti-microbial test results (based on ISO 22196), for the second bacteria loading without repeated application of hydrogen peroxide of Formulation 1G (FIG. 9C) and control (FIG. 9D). As can be seen, the coatings with polymer P9 gave complete reduction of bacteria.

The anti-microbial assay (ISO 22196) results show that Polymer P9 stabilizes hydrogen peroxide biocide on the surface (compared to control coating without the polymer) for long period of time. The stabilized hydrogen peroxide remains in its active biocide form even for 3 weeks (in the case of Formulation 1G) at least at 2 successive bacteria loadings, without recharging between, and continuously works as a sanitizer, causing the coatings to act as anti-microbial surfaces.

Example 14: Determining Activity of Ascorbic Acid and Sodium Ascorbate on Polymer P9 (APC-0009)

The stabilization of ascorbic acid and sodium ascorbate on Formulation 1H and control was tested as follows: the coupons coated with Formulation 1H and Control were treated with diluted solution of ascorbic acid or sodium ascorbate (Sigma Aldrich, 0.1% in water), the surfaced were dried for 24 h and washed with water.

Next, 3% w/w (1.5% $OCl^-$) solution of Activator 0001 was applied, dried for 24 h, and washed with water. The surfaces were tested with total-chlorine strips. Significantly lower concentration of chlorine was attached to the surface, pretreated with ascorbic acid, as compared to not treated with ascorbic acid. Following 4 successive charging processes with Activator 0001, the chlorine was successfully extracted to the surface. This means, ascorbic acid was washed out the layer and replaced by hypochlorite. The same behavior obtained with sodium ascorbate.

Figure 10A:
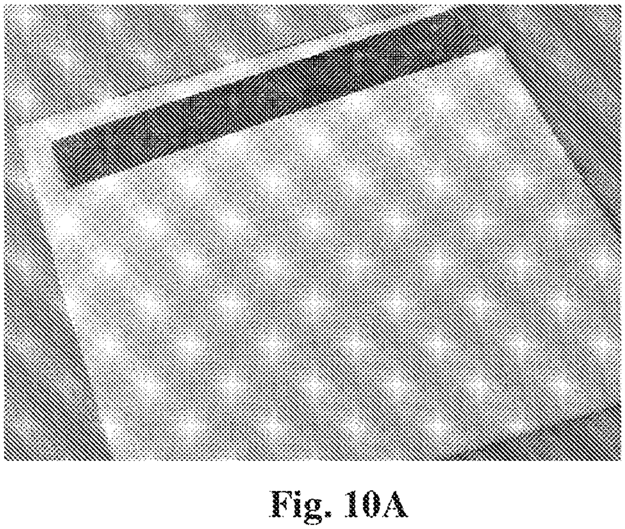
FIGS. 10A and 10B are images showing the chlorine extraction from the surfaces pre-treated with ascorbic acid: after a single chlorine application and repeated applications, respectively.
Figure 10B:
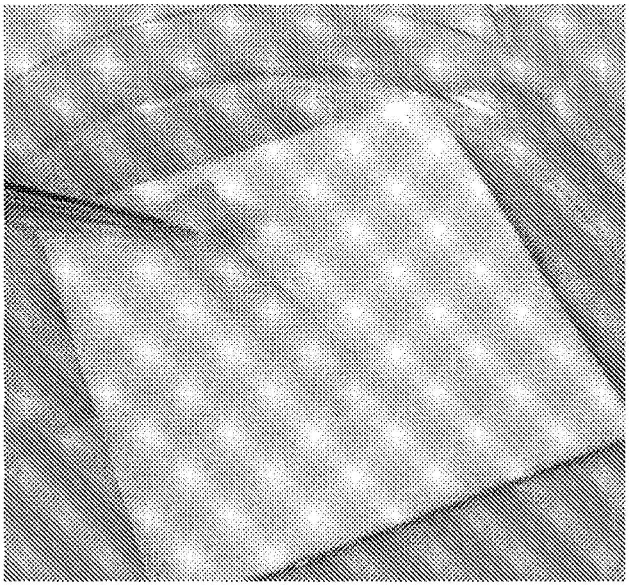

As can be see, no chlorine was observed on the strip after application with 0.1% ascorbic acid (FIG. 10A), and chlorine was observed only after several repeated applications and chlorine was observed (FIG. 10B).

The same observation was obtained with sodium bicarbonate (Sigma-Aldrich, 0.1% in water) and with sodium thiosulfate solution (Sigma Aldrich, 0.1% in water) which is known as chlorine neutralizer. It possesses negative charge following dissociation in water, $S_2O_3^{2-}$ which successfully attaches to White and Aqua-Glass APC-0009 tested and can be replaced by hypochlorite ions following a number of re-charging (c.a. 4-5), and the coatings become active.

Example 15: Antibacterial Effect of Films Comprising the Polymer P9 and P10

Polymers P9 and P10 at percentage 2-6% were blended into medium density or low-density polyethylene (LDPE) (pellets, Sigma-Aldrich) at temperatures from the range of 140-160° C. with silica beads (1.4 mm, MRC, Israel). APC-0009 and 00010 were successfully dispersed homogeneously with mechanical stirring, and no material degradation was observed. No side reactions, gas evaporation or viscosity change was obtained during the compound formation.

The resultant compounds, PE-APC-0009 and PE-APC-00010 were molded as c.a. 5x5 cm coupons for antimicrobial studies. The application of biocide (charging) was performed with Activator 0001 solution and the extracted chlorine concentration was evaluated with KI (Sigma-Aldrich, 10%), DPD (DPD Total Chlorine Reagent, Powder Pillows, Hach, USA), followed by measurement at total chlorine spectrophotometer (Hach, Pocket Colorimeter, Chlorine, Free+Total DR300 range of $Cl_2$ conc. 0.02-2 ppm, USA).

TABLE 7

| Chlorine concentration extracted from low density polyethylene (LDPE), | |
|---|---|
| Film | Concentration of chlorine extracted (ppm) |
| LDPE-APC-0009 | 0.18 ÷ 0.05 |
| LDPE-APC-00010 | 0.27 ÷ 0.04 |
| LDPE | 0.01 ÷ 0.01 |

Table 8 below shows the antibacterial activity of LDPE-APC coupons (5×5 cm) after charging with 1% available chlorine (from an Activator solution, type 4-see above) and after charging with $H_2O_2$<5% (Oxivir Plus Spray, Diversy, USA). The test was conducted according to ISO 22196, at two different inoculum concentrations of *E. coli*: log 5.5 and log 6.5, the results evaluation was performed using a "surface print" method by contacting an agar plate with the studied surface following an exposure (24 h, at room temperature) to the bacteria.

TABLE 8

| Chlorine concentration extracted from low density polyethylene (LDPE), | | | |
|---|---|---|---|
| Inoculum | Activation with Activator-1 | | Activation with $H_2O_2$ (<5.0%) |
| concentrations *E. coli* | 3.2 × 10ˆ6 CFU/mL | 3.2 × 10ˆ5 CFU/mL | 2.1 × 10ˆ5 CFU/mL |
| LDPE-APC-0009 | Full activity | Full activity | High Activity |
| LDPE-APC-00010 | Full activity | Full activity | High activity |

As shown in the Table 8, the polymer's coupons are highly active if activated with hydrogen peroxide with log 5.5 CFU, and if activated with Activator 1, full activity is obtained with log 5.5 CFU and with log 6.5 CFU is obtained with surface print method. In addition, these results show that both the hydrogen peroxide and Activator 1 (including chlorine) are successfully stabilized on blend LDPE-APC-0009/0010 coupon surfaces and remained active following solution evaporation. The charging intensity with polymeric matrix is lower if compared to coatings at the same % w/w of APC towards solids, due to high density of the polymeric matrix, as expected. This observation supports the importance of hypochlorite ions penetration into deeper layers of the solid surface and gives additional proof of ionic biocide-activity in the patented technology, and not through the covalent bonded chlorine that forms N-halamine bonds.

The LDPE-APC-0009 (prepared from low density PE beads through extrusion at 180° C.) beads were extruded at 180° C. and casted onto PE film with total thickness of 60 μm, when the LDPE-APC-0009 top-layer is 5% of the total thickness. The resultant film was studied at anti-microbial assay and excellent results were obtained.

A quantitative anti-microbial test was performed for the slides following activation with Activator 001 (including Chlorine), and incubation time of 24 hours. The results revealed extremely high activity of the LDPE-APC-0009, which showed a complete reduction of 3×10ˆ6 cfu of *E. coli* on the surface (ca. Log 7 CFU/ml in inoculum) following 24 h of contact time at room temperature.

The invention claimed is:

1. A melamine-based compound having a structure represented by Formula (I):

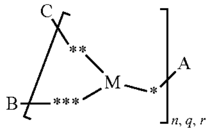

wherein M is a melamine-based monomeric unit, *, , * denote polymerization points, n denote the number of * and is selected from 0 to 10, q denote the number of  and is selected from 0 to 10, r denote the number of * and is selected from 0 to 10, provided that n+q+r is 0 or n+q+r is at least 1 and wherein A, B and C are end groups and each is independently selected from OH, H, and

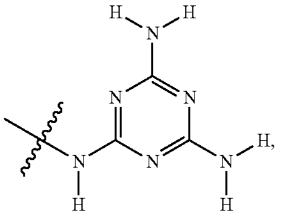

, wherein when n+q+r is 0, at least one of A, B or C is not H and wherein the monomeric units having a structure represented by Formula (II):

(II)

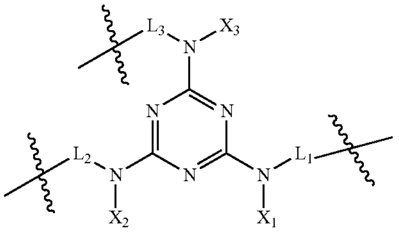

wherein:

each of $X_1$, $X_2$, and $X_3$, is H;

$L_2$ is absent;

$L_1$ is $R_1$-$R^a$, wherein $R_1$ is $(C(OH))_m$ or $(CH_2)_m$; and $L_3$ is absent or $R_3$-$R^c$, wherein $R_3$ is $(C(OH))_m$ or $(CH_2)_m$;

m is an integer selected from 1 to 10;

$R^a$ and $R^c$ is independently of the other selected from absent $(—NH—C(═O)—NH—)_p$, $(—NH—C(═O)—NH—CH_2)_p$, $—NH—(CH_2)_p—C(OH)$, $—(CH_2)_p$, $—(CH_2)_p—C(═O)$, $—(CH_2)_p—C(OH)$, $(C(OH))_p$, $—C(OH)—(CH_2)_p—NH$, and $—C(OH)—(CH_2)_p—C(OH)$; p is an integer selected from 1 to 10 and ∿ represents a connection point.

2. The melamine-based compound of claim 1, wherein (i) $R_1$, and $R_3$ is independently of the other selected from $(C(OH))_m$ and $(CH_2)_m$, and m is independently selected from 1 to 6, (ii) $R_1$ is $(C(OH))_m$, $R_3$ is absent and m is independently selected from 1 to 6, (iii) $R_1$ is $(C(OH))_m$, $R_3$ is $(C(OH))_m$ and m is independently selected from 1 to 6, (iv) $R_1$ is $(C(OH))_m$, $R_3$ is $(CH_2)_m$ and m is independently selected from 1 to 6, (v) $R_1$ is $(CH_2)_m$, $R_3$ is $(C(OH))_m$ and m is independently selected from 1 to 6, (vi) $R_1$ is $(CH_2)_m$, absent and m is independently selected from 1 to 6, or (vii) $R_1$ is $(CH_2)_m$, $R_3$ is $(CH_2)_m$ and m is independently selected from 1 to 6.

3. The melamine-based compound of claim 1, wherein each of $R^a$ and $R^c$ is independently of the other selected from absent, $(—NH—C(=O)—NH—CH_2)_p$, $—(CH_2)_p—C(OH)$, and $(C(OH))_p$, wherein p is an integer between 1 to 6.

4. The melamine-based compound of claim 1, wherein at least one of (i) $R_1$ is $(C(OH))_m$ or $(CH_2)_m$ and $R^a$ is $(—NH—C(=O)—NH—CH_2)_p$, $—(CH_2)_p—C(=O)$, $—(CH_2)_p—C(OH)$, or $(C(OH))_p$, (ii) $R_3$ is absent, $(CH_2)_m$, or $(C(OH))_m$ and $R^c$ is absent, $(CH_2)_p—C(OH)$, $(NH—CH_2)_p$, or $(C(OH))_p$.

5. The melamine-based compound of claim 1, wherein the monomeric unit having a structure represented by Formula (VII):

(VII)

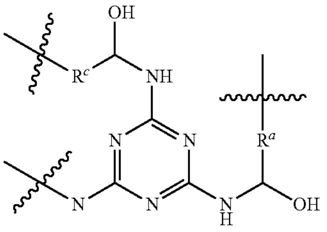

wherein $R^a$ is C(OH), and $R^c$ is C(OH), optionally wherein $R^a$ is $—(CH_2)_p—C(OH)$, $R^c$ is $—(CH_2)_p—C(OH)$ and p is 3 or 4.

6. The melamine-based compound of claim 1, wherein the monomeric unit having a structure represented by Formula (IX):

(IX)

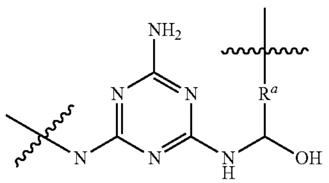

wherein $R^a$ is absent, C(OH), $—(CH_2)_p—C(OH)$, $—(CH_2)_p—C(=O)$, and p is 1, 2, 3, 4, 5, or 6.

7. The melamine-based compound of claim 1, wherein the monomeric unit having a structure represented by Formula (XI):

(XI)

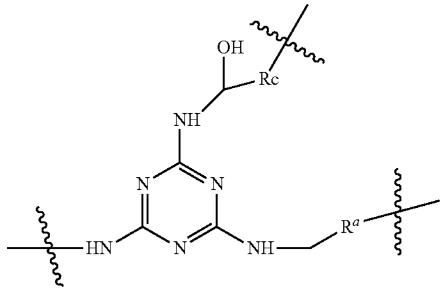

wherein $R^a$ is as defined herein above and wherein $R^c$ is absent, C(OH), $—(CH_2)_p—C(OH)$ and p is 1, 2, 3, 4, 5, or 6, optionally wherein $R^c$ is absent, C(OH), $(CH_2)_3—C(OH)$ or $(CH_2)_4—C(OH)$.

8. The melamine-based compound of claim 1, wherein the monomeric unit having a structure represented by any one of Formula (XVII), (XIV), or (XXIII):

(XVII)

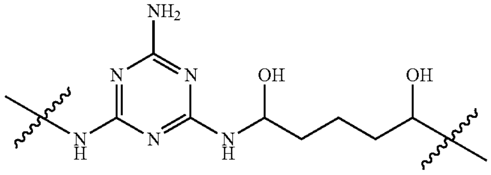

, (XIV)

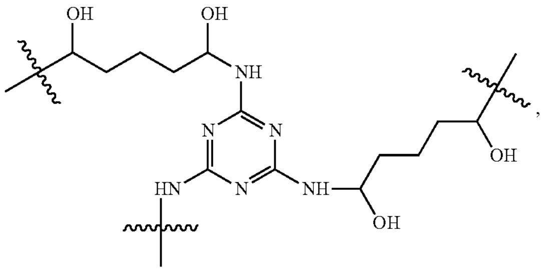

, or (XXIII)

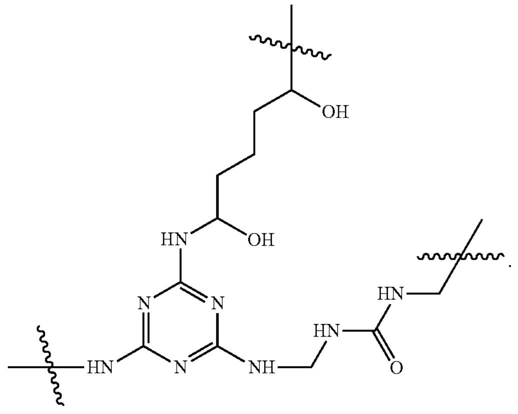

.

9. A product comprising the melamine-based compound of claim 1 and at least one product specific-substance, wherein the at least one product specific-substance is at least one of a second polymer, a powder mixture, an adhesive, a sealant, a pigment, a varnish or a wax, optionally said product is a paint formulation.

10. A particulate matter comprising the melamine-based compound of claim 1.

11. A method for reducing or eliminating growth of at least one microbe, the method comprises applying an effective amount of a melamine-based compound, a population of polymers or a product comprising the same, on at least one surface, and applying on said surface at least one biocide, wherein the melamine-based compound is defined in claim 1, and wherein the melamine-based compound and the at least one biocide are capable of interacting by non-covalent binding to thereby reduce or eliminate growth of at least one microbial.

12. The method of claim 11, comprising applying the at least one biocide by spraying, brushing, fogging, wiping, dipping or any combination thereof.

13. The method of claim 11, wherein the biocide is a negatively charged, polar, electronegative biocide.

14. The method of claim 11, wherein the surface is metal surface, wood surface, plastic surface, ceramic surface, glass surface, tiles, textile surface or combination thereof.

15. The method of claim 11, wherein the microbe is at least one of bacteria, a virus, a yeast, a fungi, a protozoa, an algae, an archaea, their toxins or by-products.

16. A melamine-based compound having a structure represented by Formula (I):

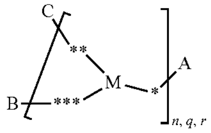

wherein M is a melamine-based monomeric unit, *, , and * denote polymerization points, n denote the number of * and is selected from 0 to 10, q denote the number of  and is selected from 0 to 10, r denote the number of * and is selected from 0 to 10, provided that n+q+r is 0 or n+q+r is at least 1 and wherein A, B, and C are end groups and each is independently selected from OH, H, and

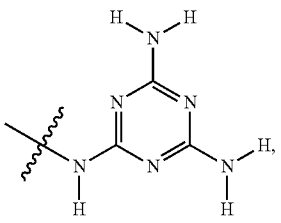

wherein when n+q+r is 0, at least one of A, B, or C is not H and wherein the monomeric units having a structure represented by Formula (II):

(II)

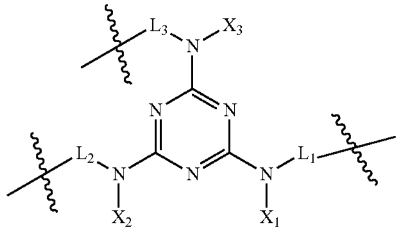

wherein:

each of $X_1$, $X_2$, and $X_3$ is H;

$L_2$ is absent;

$L_1$ is $R_1$-$R^a$, wherein $R_1$ is $(C(OH))_m$; and $L_3$ is absent or $R_3$-$R^c$, wherein $R_3$ is $(C(OH))_m$; m is an integer selected from 1 to 10, $R^a$ and $R^c$ is independently of the other selected from absent, $(-NH-C(=O)-NH-)_p$, $(-NH-C(=O)-NH-CH_2)_p$, $-NH-(CH_2)_p-C(OH)$, $-(CH_2)_p$, $-(CH_2)_p-C(=O)$, $-(CH_2)_p-C(OH)$, $(C(OH))_p$, $-C(OH)-(CH_2)_p-NH$, and $-C(OH)-(CH_2)_p-C(OH)$; p is an integer selected from 1 to 10 and represents a connection point.

17. The melamine-based compound of claim 16, wherein the monomeric unit having a structure represented by Formula (VII) or Formula (IX):

(VII)

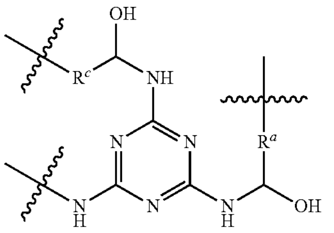

or (IX)

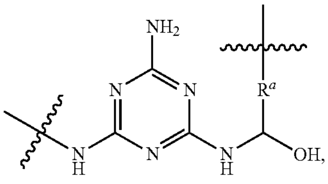

wherein $R^a$ is absent, C(OH), $-(CH_2)_p-C(OH)$, $-(CH_2)_p-C(=O)$, and p is 1, 2, 3, 4, 5, or 6.

18. The melamine-based compound of claim 16, wherein the monomeric unit having a structure represented by any one of Formula (XVII), (XIV), or (XXIII):

(XVII)

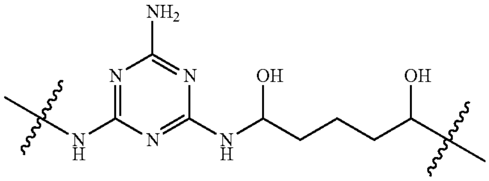

, (XIV)

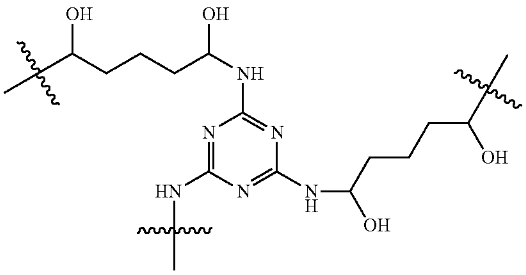

, or

-continued (XXIII)

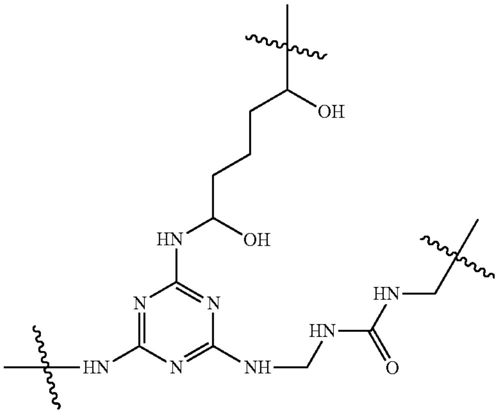

.

19. The melamine-based compound of claim 6, wherein $R^a$ is absent, C(OH), $(CH_2)_3$—C(OH), $(CH_2)_4$—C(OH), $(CH_2)_3$—C(═O) or $(CH_2)_4$—C(═O).

20. The melamine-based compound of claim 17, wherein $R^a$ is absent, C(OH), $(CH_2)_3$—C(OH), $(CH_2)_4$—C(OH), $(CH_2)_3$—C(═O) or $(CH_2)_4$—C(═O).

* * * * *